(12) United States Patent
Kontomaris

(10) Patent No.: US 9,828,536 B2
(45) Date of Patent: Nov. 28, 2017

(54) COMBINATIONS OF E-1,3,3,3-TETRAFLUOROPROPENE AND AT LEAST ONE TETRAFLUOROETHANE AND THEIR USE FOR HEATING

(75) Inventor: Konstantinos Kontomaris, Wilmington, DE (US)

(73) Assignee: THE CHEMOURS COMPANY FC, LLC, Wilmington, DE (US)

( * ) Notice: Subject to any disclaimer, the term of this patent is extended or adjusted under 35 U.S.C. 154(b) by 508 days.

(21) Appl. No.: 13/988,028

(22) PCT Filed: Dec. 14, 2011

(86) PCT No.: PCT/US2011/064974
§ 371 (c)(1),
(2), (4) Date: May 17, 2013

(87) PCT Pub. No.: WO2012/082939
PCT Pub. Date: Jun. 21, 2012

(65) Prior Publication Data
US 2013/0247597 A1 Sep. 26, 2013

Related U.S. Application Data

(60) Provisional application No. 61/422,935, filed on Dec. 14, 2010.

(51) Int. Cl.
*C09K 5/04* (2006.01)
*F24H 4/00* (2006.01)
*F25B 45/00* (2006.01)

(52) U.S. Cl.
CPC ............... *C09K 5/045* (2013.01); *F24H 4/00* (2013.01); *F25B 45/00* (2013.01); *C09K 2205/126* (2013.01); *C09K 2205/22* (2013.01)

(58) Field of Classification Search
CPC ............... C09K 5/045; C09K 2205/40; C09K 2205/41; F25B 30/02
See application file for complete search history.

(56) References Cited

U.S. PATENT DOCUMENTS 5,211,023 A * 5/1993 Matsuura .................. F25B 5/02
62/117
6,018,954 A * 2/2000 Assaf ................................ 62/94
(Continued)

FOREIGN PATENT DOCUMENTS

GB 1 578 933 A 11/1980
JP 4-110388 A 4/1992
(Continued)

OTHER PUBLICATIONS

PCT International Search Report and Written Opinion dated Apr. 12, 2012.
(Continued)

*Primary Examiner* — Elizabeth Martin
*Assistant Examiner* — Zachary R Anderegg
(74) *Attorney, Agent, or Firm* — N. Lynn Tucker

(57) ABSTRACT

Disclosed herein is a method for producing heating comprising condensing a vapor working fluid comprising (a) E-CF3CH=CHF and (b) at least one tetrafluoroethane of the formula C2H2F4. Also disclosed herein is a heat pump apparatus containing a working fluid comprising (a) E-CF3CH=CHF and (b) at least one tetrafluoroethane of the formula C2H2F4. Also disclosed herein is a method for raising the maximum feasible condenser operating temperature in a heat pump apparatus suitable for use with HFC-134a, comprising charging the heat pump with a working fluid comprising (a) E-CF3CH=CHF and (b) at least one tetrafluoroethane of the formula C2H2F4. Also disclosed herein is a method for replacing HFC-134a refrigerant in a heat pump designed for HFC-134a comprising providing a (Continued)

replacement working fluid comprising (a) E-CF3CH=CHF and (b) at least one tetrafluoroethane of the formula C2H2F4.

18 Claims, 2 Drawing Sheets

(56) References Cited

U.S. PATENT DOCUMENTS

| | | | |
|---|---|---|---|
| 7,524,805 B2 | 4/2009 | Singh et al. | |
| 7,569,170 B2* | 8/2009 | Minor | 264/53 |
| 7,825,081 B2 | 11/2010 | Singh et al. | |
| 8,148,317 B2 | 4/2012 | Singh et al. | |
| 2004/0256594 A1 | 12/2004 | Singh et al. | |
| 2006/0106263 A1 | 5/2006 | Miller et al. | |
| 2007/0108403 A1* | 5/2007 | Sievert et al. | 252/67 |
| 2008/0099190 A1 | 5/2008 | Singh et al. | |
| 2008/0230738 A1 | 9/2008 | Minor et al. | |
| 2009/0211282 A1* | 8/2009 | Nishimura et al. | 62/238.6 |
| 2009/0241569 A1* | 10/2009 | Okada | F25B 40/00 62/196.1 |
| 2010/0011803 A1* | 1/2010 | Warnecker et al. | 62/498 |
| 2010/0154444 A1 | 6/2010 | Hulse et al. | |
| 2012/0117990 A1 | 5/2012 | Rached et al. | |
| 2012/0187331 A1 | 7/2012 | Singh et al. | |

FOREIGN PATENT DOCUMENTS

| | | |
|---|---|---|
| WO | 20051105947 A2 | 11/2005 |
| WO | 2006/094303 A2 | 9/2006 |
| WO | 2009/018117 A1 | 2/2009 |
| WO | 2011/015737 A1 | 2/2011 |
| WO | 2011/101620 A2 | 8/2011 |
| WO | 2011/101621 A2 | 8/2011 |
| WO | 2011/101622 A2 | 8/2011 |

OTHER PUBLICATIONS

The Scientific Assessment of Ozone Depletion, 2002, A report of the World Meteorological Association's Global Ozone Research and Monitoring Project, section 1.4.4, pp. 1.28 to 1.31.

M. F. Doherty and M.F. Malone, Conceptual Design of Distillation Systems, McGraw-Hill (New York), 2001, pp. 185-186, 351-359.

2006 ASHRAE Handbook, Refrigeration, Chapter 4, pp. 4.1-4.6, Atlanta, GA.

Solomon et al., IPCC, 2007, Climate Change 2007: The Physical Science Basis. Contribution of Working Group I to the Fourth Assessment Report of the Intergovernmental Panel on Climate Change from the section entitled Working Group 1 Report: "The Physical Science Basis", Chapter 2, pp. 212-213, Table 2.14.

Papadimitriou et al., *Physical Chemistry Chemical Physics*, 2007, vol. 9, pp. 1-13.

Javadi et al., Atmospheric Chemistry and Physics Discussions 8, 1069-1088, 2008.

Opposition Brief to EP2652064, by Arkema France, filed Apr. 20, 2017.

Kutz, M., Mechanical Engineers' Handbook, $2^{nd}$ Edition, John Wiley & Sons, Inc. (New York), Chapter 62, Refrigeration, 1998, pp. 1879-1897.

Wang, S. K., Handbook of Air Conditioning and Refrigeration, 2nd Edition, McGraw-Hill (New York), 2000, Chapter 12, Heat pumps, heat recovery, gas cooling, and cogeneration systems, pp. 12.1-12.30.

* cited by examiner

_COMBINATIONS OF E-1,3,3,3-TETRAFLUOROPROPENE AND AT LEAST ONE TETRAFLUOROETHANE AND THEIR USE FOR HEATING_

This application represents a national filing under 35 U.S.C. 371 of International Application No. PCT/US11/64974 filed Dec. 14, 2011, and claims priority of U.S. Provisional Application No. 61/422,935 filed Dec. 14, 2010.

FIELD OF THE INVENTION

The present disclosure relates to methods for producing heating wherein the working fluid composition comprises E-1,3,3,3-tetrafluoropropene and tetrafluoroethanes. In particular, the methods are for producing heating in positive displacement and centrifugal heat pumps that utilize refrigerants containing E-1,3,3,3-tetrafluoropropene and at least one tetrafluoroethane.

BACKGROUND OF THE INVENTION

Conventional methods of producing heating, including burning fossil fuels and electric resistance heat generation, have disadvantages of increasing operating costs and low energy efficiency. Heat pumps provide an improvement over these methods.

Heat pumps extract low temperature heat from some available source through evaporation of a working fluid at an evaporator, compress the working fluid vapor to higher pressures and temperatures and supply high temperature heat by condensing the working fluid vapor at a condenser. Residential heat pumps use working fluids such as R410A to provide air conditioning and heating to homes. High temperature heat pumps using either positive displacement or centrifugal compressors use various working fluids, such as HFC-134a, HFC-245fa and CFC-114, among others. The choice of working fluid for a high temperature heat pump is limited by the highest condenser operating temperature required for the intended application and the resulting condenser pressure. The working fluid must be chemically stable at the highest system temperature and it must generate a vapor pressure at the maximum condenser temperature that does not exceed the maximum allowable working pressure of available equipment components (e.g. compressors or heat exchangers). The working fluid must also have a critical temperature higher than the maximum targeted condensing temperature.

Increasing energy costs, global warming and other environmental impacts, in combination with the relatively low energy efficiency of heating systems that operate by fossil fuel combustion and electrical resistance heating make heat pumps an attractive alternative technology. HFC-134a, HFC-245fa and CFC-114 have high global warming potential and CFC-114 also has impact on ozone depletion. There is a need for low global warming potential, low ozone depletion potential working fluids for use in high temperature heat pumps. Fluids that enable operation of existing heat pump equipment designed for HFC-134a at higher condenser temperatures while still attaining an adequate heating capacity would be particularly advantageous.

SUMMARY OF THE INVENTION

The invention includes a method for producing heating. The method comprises condensing a vapor working fluid comprising (a) E-$CF_3CH$=CHF and (b) at least one tetrafluoroethane of the formula $C_2H_2F_4$, in a condenser, thereby producing a liquid working fluid; provided that the weight ratio of E-$CF_3CH$=CHF to the total amount of E-$CF_3CH$=CHF and $C_2H_2F_4$ in the working fluid is 0.01 to 0.99 (e.g., from about 0.05 to about 0.82 or from about 0.05 to about 0.80).

The invention also includes a heat pump apparatus. The heat pump apparatus contains a working fluid comprising (a) E-$CF_3CH$=CHF and (b) at least one tetrafluoroethane of the formula $C_2H_2F_4$; provided that the weight ratio of E-$CF_3CH$=CHF to the total amount of E-$CF_3CH$=CHF and $C_2H_2F_4$ is 0.01 to 0.99 (e.g., from about 0.05 to about 0.82 or from about 0.05 to about 0.80).

The invention also includes a method for raising the maximum feasible condenser operating temperature in a heat pump apparatus suitable for use with HFC-134a working fluid relative to the maximum feasible condenser operating temperature when HFC-134a is used as the heat pump working fluid while also reducing the GWP of the working fluid relative to HFC-134a. This method comprises charging the heat pump with a working fluid comprising (a) E-$CF_3CH$=CHF and (b) at least one tetrafluoroethane of the formula $C_2H_2F_4$; provided that the weight ratio of E-$CF_3CH$=CHF to the total amount of E-$CF_3CH$=CHF and $C_2H_2F_4$ is 0.01 to 0.99 (e.g., from about 0.05 to about 0.82 or from about 0.05 to about 0.80).

The invention also includes a method for replacing HFC-134a refrigerant in a heat pump designed for HFC-134a with working fluids having lower GWPs. This method comprises providing a replacement working fluid comprising (a) E-$CF_3CH$=CHF and (b) at least one tetrafluoroethane of the formula $C_2H_2F_4$; provided that the weight ratio of E-$CF_3CH$=CHF to the total amount of E-$CF_3CH$=CHF and $C_2H_2F_4$ is 0.01 to 0.99 (e.g., from about 0.05 to about 0.82 or from about 0.05 to about 0.80).

The invention also includes a composition. The composition comprises from about 10 weight percent to about 40 weight percent E-$CF_3CH$=CHF and from about 90 weight percent to about 60 weight percent $CHF_2CHF_2$.

DETAILED DESCRIPTION

Figure 1:
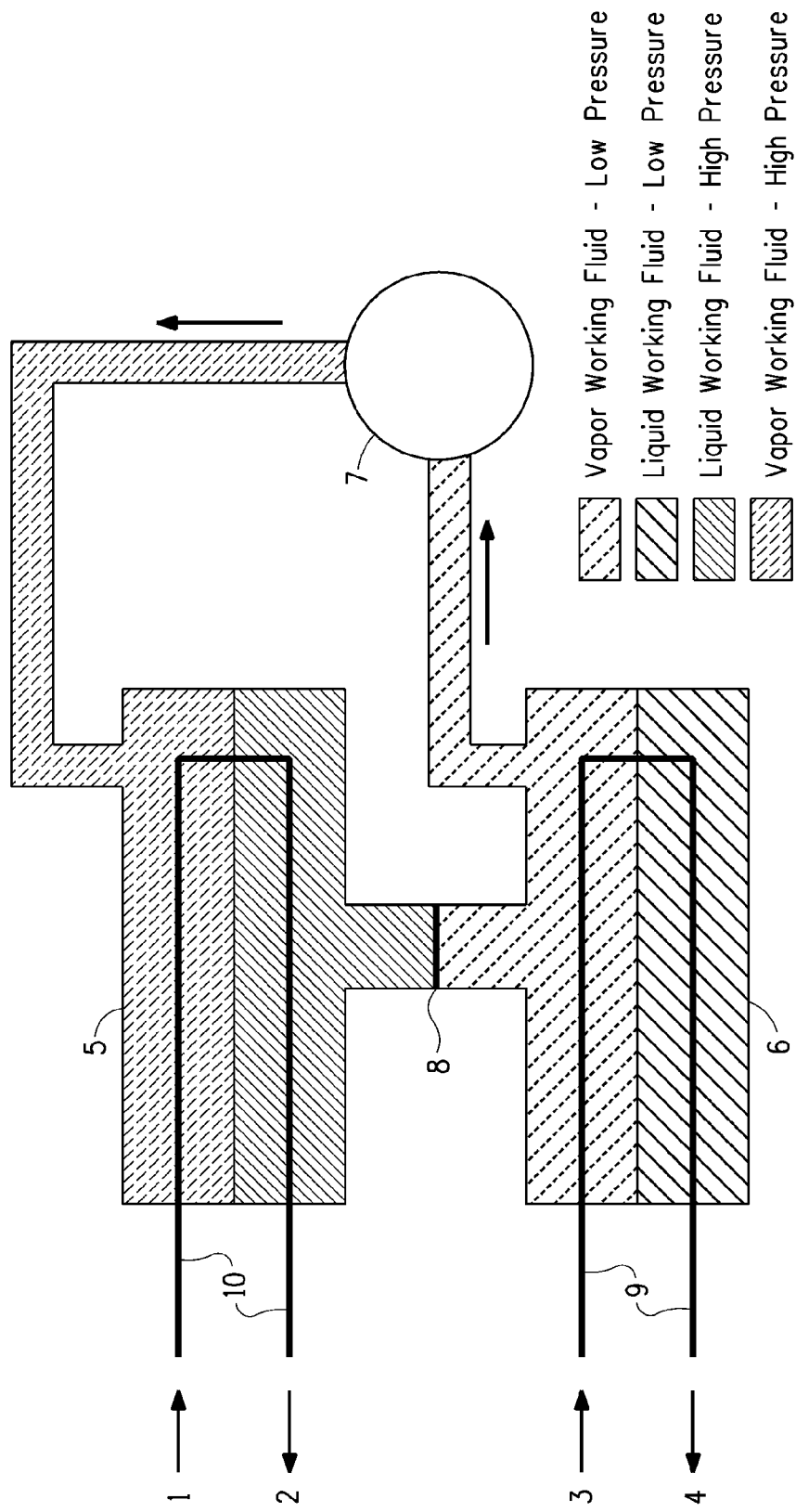
FIG. 1 is a schematic diagram of one embodiment of a flooded evaporator heat pump apparatus which utilizes a composition containing E-$CF_3CH$=CHF and (b) at least one tetrafluoroethane of the formula $C_2H_2F_4$.

Before addressing details of embodiments described below, some terms are defined or clarified.

Global warming potential (GWP) is an index for estimating relative global warming contribution due to atmospheric emission of a kilogram of a particular greenhouse gas (such as a refrigerant or working fluid) compared to emission of a kilogram of carbon dioxide. GWP can be calculated for different time horizons showing the effect of atmospheric lifetime for a given gas. The GWP for the 100 year time horizon is commonly the value referenced. Any values for GWP reported herein are based on the 100 year time horizon.

Ozone depletion potential (ODP) is defined in "The Scientific Assessment of Ozone Depletion, 2002, A report of the World Meteorological Association's Global Ozone Research and Monitoring Project," section 1.4.4, pages 1.28 to 1.31 (see first paragraph of this section). ODP represents the extent of ozone depletion in the stratosphere expected from a compound (such as a refrigerant or working fluid) on a mass-for-mass basis relative to fluorotrichloromethane (CFC-11).

Cooling capacity (sometimes referred to as refrigeration capacity) is the change in enthalpy of a working fluid in an evaporator per unit mass of working fluid circulated through the evaporator. Volumetric cooling capacity is a term to define heat removed by the working fluid in the evaporator per unit volume of working fluid vapor exiting the evaporator and entering the compressor. The cooling capacity is a measure of the ability of a working fluid to produce cooling. Therefore, the higher the volumetric cooling capacity of the working fluid, the greater the cooling rate that can be produced at the evaporator with the maximum volumetric flow rate achievable with a given compressor.

Similarly, volumetric heating capacity is a term to define the amount of heat supplied by the working fluid in the condenser per unit volume of working fluid vapor entering the compressor. The higher the volumetric heating capacity of the working fluid, the greater the heating rate that is produced at the condenser with the maximum volumetric flow rate achievable with a given compressor.

Coefficient of performance (COP) for cooling is the amount of heat removed at the evaporator of a cycle divided by the required energy input to operate the cycle (e.g. to operate the compressor), the higher the COP, the higher the cycle energy efficiency. COP is directly related to the energy efficiency ratio (EER), that is, the efficiency rating for refrigeration, air conditioning, or heat pump equipment at a specific set of internal and external temperatures. Similarly, the coefficient of performance for heating is the amount of heat delivered at the condenser of a cycle divided by the required energy input to operate the cycle (e.g. to operate the compressor).

Temperature glide (sometimes referred to simply as "glide") is the absolute value of the difference between the starting and ending temperatures of a phase-change process by a working fluid within an equipment component of a cooling or heating cycle system, exclusive of any subcooling or superheating. This term may be used to describe condensation or evaporation of a near azeotrope or non-azeotropic composition. When referring to the temperature glide of a refrigeration, air conditioning or heat pump system, it is common to provide the average temperature glide being the average of the temperature glide in the evaporator and the temperature glide in the condenser.

Subcooling is the reduction of the temperature of a liquid below that liquid's saturation temperature for a given pressure. By cooling the liquid working fluid exiting the condenser below its saturation point, the capacity of the working fluid to absorb heat during the evaporation step can be increased. Sub-cooling thereby improves both the cooling and heating capacity and energy efficiency of a cooling or heating system based on the conventional vapor-compression cycle.

Superheat is the increase of the temperature of the vapor exiting the evaporator above the vapor's saturation temperature at the evaporator pressure. By heating a vapor above the saturation point, the likelihood of condensation upon compression is minimized. The superheat can also contribute to the cycle's cooling and heating capacity.

As used herein, a working fluid is a composition comprising a compound or mixture of compounds that primarily function to transfer heat from one location at a lower temperature (e.g. an evaporator) to another location at a higher temperature (e.g. a condenser) in a cycle wherein the working fluid undergoes a phase change from a liquid to a vapor, is compressed and is returned back to liquid through cooling of the compressed vapor in a repeating cycle. The cooling of a vapor compressed above its critical point can return the working fluid to a liquid state without condensation. The repeating cycle may take place in systems such as heat pumps, refrigeration systems, refrigerators, freezers, air conditioning systems, air conditioners, chillers, and the like. Working fluids may be a portion of formulations used within the systems. The formulations may also contain other chemical components (e.g., additives) such as those described below.

Flammability is a term used to mean the ability of a composition to ignite and/or propagate a flame. For working fluids, the lower flammability limit ("LFL") is the minimum concentration of the working fluid in air that is capable of propagating a flame through a homogeneous mixture of the working fluid and air under test conditions specified in ASTM (American Society of Testing and Materials) E681-2001. The upper flammability limit ("UFL") is the maximum concentration of the working fluid in air that is capable of propagating a flame through a homogeneous mixture of the composition and air as determined by ASTM E-681. As the content of the non-flammable component in a mixture comprising a flammable and a non-flammable component increases, the LFL and the UFL approach each other. When the content of the non-flammable component in the mixture reaches a critical value, the LFL and UFL of the mixture become equal. Compositions containing more of the non-flammable component than this critical value are non-flammable. For a single component working fluid or an azeotropic working fluid blend, the composition will not change during a leak and therefore composition change during leaks will not be a factor in determining flammability. For many refrigeration, air conditioning, or heat pump applications, the refrigerant or working fluid is desired (if not required) to be non-flammable.

An azeotropic composition is a mixture of two or more different components which, when in liquid form under a given pressure, will boil at a substantially constant temperature, which temperature may be higher or lower than the boiling temperatures of the individual components, and which will provide a vapor composition essentially identical to the overall liquid composition undergoing boiling (see, e.g., M. F. Doherty and M. F. Malone, Conceptual Design of Distillation Systems, McGraw-Hill (New York), 2001, 185-186, 351-359).

Accordingly, the essential features of an azeotropic composition are that at a given pressure, the boiling point of the liquid composition is fixed and that the composition of the vapor above the boiling composition is essentially that of the overall boiling liquid composition (i.e., no fractionation of the components of the liquid composition takes place). It is recognized that both the boiling point and the weight percentages of each component of the azeotropic composition may change when the azeotropic composition is subjected to boiling at different pressures. Thus, an azeotropic composition may be defined in terms of the unique relationship that exists among the components or in terms of the compositional ranges of the components or in terms of exact weight percentages of each component of the composition characterized by a fixed boiling point at a specified pressure.

As used herein, an azeotrope-like (also referred to as near azeotropic) composition means a composition that behaves essentially like an azeotropic composition (i.e., has constant boiling characteristics or a tendency not to fractionate upon boiling or evaporation). Hence, during boiling or evaporation, the vapor and liquid compositions, if they change at all, change only to a minimal or negligible extent. This is to be contrasted with non-azeotrope-like compositions in which during boiling or evaporation, the vapor and liquid compositions change to a substantial degree.

Additionally, azeotrope-like compositions exhibit virtually equal dew point pressure and bubble point pressure. That is to say that the difference in the dew point pressure and bubble point pressure at a given temperature will be a small value, such as 3% or 5% difference.

A non-azeotropic composition or a non-azeotrope-like composition is a mixture of two or more substances that behaves as a mixture rather than a single substance. One way to characterize a non-azeotropic composition is that the vapor produced by partial evaporation or distillation of the liquid has a substantially different composition from the liquid from which it was evaporated or distilled, that is, the mixture distills/refluxes with substantial composition change. Another way to characterize a non-azeotropic composition is that the bubble point vapor pressure and the dew point vapor pressure of the composition at a particular temperature are substantially different. Herein, a composition is non-azeotropic if the difference in dew point pressure and bubble point pressure is greater than or equal to 5 percent (based upon the bubble point pressure).

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

The transitional phrase "consisting of" excludes any element, step, or ingredient not specified. If in the claim such would close the claim to the inclusion of materials other than those recited except for impurities ordinarily associated therewith. When the phrase "consists of" appears in a clause of the body of a claim, rather than immediately following the preamble, it limits only the element set forth in that clause; other elements are not excluded from the claim as a whole.

The transitional phrase "consisting essentially of" is used to define a composition, method or apparatus that includes materials, steps, features, components, or elements, in addition to those literally disclosed provided that these additional included materials, steps, features, components, or elements do materially affect the basic and novel characteristic(s) of the claimed invention. The term 'consisting essentially of' occupies a middle ground between "comprising" and 'consisting of'.

Where applicants have defined an invention or a portion thereof with an open-ended term such as "comprising," it should be readily understood that (unless otherwise stated) the description should be interpreted to also describe such an invention using the terms "consisting essentially of" or "consisting of."

Also, use of "a" or "an" are employed to describe elements and components described herein. This is done merely for convenience and to give a general sense of the scope of the invention. This description should be read to include one or at least one and the singular also includes the plural unless it is obvious that it is meant otherwise.

Unless otherwise defined, all technical and scientific terms used herein have the same meaning as commonly understood by one of ordinary skill in the art to which this invention belongs. Although methods and materials similar or equivalent to those described herein can be used in the practice or testing of embodiments of the present invention, suitable methods and materials are described below. All publications, patent applications, patents, and other references mentioned herein are incorporated by reference in their entirety, unless a particular passage is cited. In case of conflict, the present specification, including definitions, will control. In addition, the materials, methods, and examples are illustrative only and not intended to be limiting.

Compositions

Compositions as disclosed for use in the present method include working fluids comprising (a) E-CF$_3$CH=CHF (E-HFO-1234ze or trans-HFO-1234ze) and (b) at least one compound of the formula CF$_2$XCHFY wherein X and Y are each selected from the group consisting of H and F; provided that when X is H, Y is F and when X is F, Y is H. These compositions include as component (b) one or both of the two tetrafluoroethane isomers of formula C$_2$H$_2$F$_4$ (i.e., 1,1,2,2-tetrafluoroethane (HFC-134, CHF$_2$CHF$_2$) and/or 1,1,1,2-tetrafluoroethane (HFC-134a, CF$_3$CH$_2$F)).

E-CF$_3$CH=CHF is available commercially from certain fluorocarbon manufacturers (e.g., Honeywell International Inc., Morristown, N.J.) or may be made by methods known in the art. In particular, E-CF$_3$CH=CHF may be prepared by dehydrofluorination of a 1,1,1,2,3-pentafluoropropane (HFC-245eb, CF$_3$CHFCH$_2$F) or 1,1,1,3,3-pentafluoropropane (HFC-245fa, CF$_3$CH$_2$CHF$_2$). The dehydrofluorination reaction may take place in the vapor phase in the presence or absence of catalyst, and also in the liquid phase by reaction with caustic, such as NaOH or KOH. These reactions are described in more detail in U.S. Patent Publication No. 2006/0106263, incorporated herein by reference.

Compounds of formula C$_2$H$_2$F$_4$ may be available commercially or may be prepared by methods known in the art, for example by the method described in United Kingdom Pat. No. 1578933 (incorporated herein by reference) by the hydrogenation of tetrafluoroethylene. The latter reaction may be conveniently effected at normal or elevated temperatures, for example up to 250° C., in the presence of a hydrogenation catalyst, for instance, palladium on alumina. Additionally, HFC-134 may be made by the hydrogenation of 1,2-dichloro-1,1,2,2-tetrafluoroethane (i.e., CClF$_2$CClF$_2$ or CFC-114) to 1,1,2,2-tetrafluoroethane as reported by J. L. Bitner et al. in U.S. Dep. Comm. Off. Tech. Serv/Rep. 136732, (1958), pp. 25-27, incorporated herein by reference. HFC-134a may be made by the hydrogenation of 1,1-dichloro-1,2,2,2-tetrafluoroethane (i.e., CCl$_2$FCF$_3$ or CFC-114a) to 1,1,1,2-tetrafluoroethane.

In one embodiment, component (b) is CHF$_2$CHF$_2$ and the weight ratio of E-CF$_3$CH=CHF to the total amount of E-CF$_3$CH=CHF and CHF$_2$CHF$_2$ is from about 0.01 to 0.99 (e.g., from about 0.05 to about 0.82). Compositions comprising E-CF$_3$CH=CHF and CHF$_2$CHF$_2$ are considered to have moderate glide, or less than 0.1° C. temperature glide, when the weight ratio of E-CF$_3$CH=CHF to the total amount of E-CF$_3$CH=CHF and CHF$_2$CHF$_2$ is from about 0.01 to 0.99 (e.g., from about 0.05 to about 0.82). These compositions are considered to have low temperature glide, or less than 0.05° C. temperature glide when the weight ratio of E-CF$_3$CH=CHF to the total amount of E-CF$_3$CH=CHF and $CHF_2CHF_2$ is from about 0.01 to 0.53 (e.g., from about 0.05 to about 0.53). Of note are compositions with the weight ratio of E-$CF_3CH$=CHF to the total amount of E-$CF_3CH$=CHF and $CHF_2CHF_2$ is from about 0.20 to 0.40, which are considered to have negligible temperature glide, or less than 0.01° C. temperature glide.

In one embodiment, component (b) is $CHF_2CHF_2$ and the weight ratio of E-$CF_3CH$=CHF to the total amount of E-$CF_3CH$=CHF and $CHF_2CHF_2$ is from about 0.01 to 0.69 (e.g., from about 0.05 to about 0.69). The compositions comprising E-$CF_3CH$=CHF and $CHF_2CHF_2$ are considered to be non-flammable when the weight ratio of E-$CF_3CH$=CHF to the total amount of E-$CF_3CH$=CHF and $CHF_2CHF_2$ is from about 0.01 to 0.69. The compositions comprising E-$CF_3CH$=CHF and $CHF_2CHF_2$ are considered to be non-flammable when the weight ratio of E-$CF_3CH$=CHF to the total amount of E-$CF_3CH$=CHF and $CHF_2CHF_2$ is from about 0.01 to 0.699 (e.g., from about 0.05 to about 0.699).

In one embodiment, component (b) is $CHF_2CHF_2$ and the weight ratio of E-$CF_3CH$=CHF to the total amount of E-$CF_3CH$=CHF and $CHF_2CHF_2$ is from about 0.01 to 0.56. The compositions comprising E-$CF_3CH$=CHF and $CHF_2CHF_2$ are considered to provide capacity and COP within 4% of the maximum attainable performance when the weight ratio of E-$CF_3CH$=CHF to the total amount of E-$CF_3CH$=CHF and $CHF_2CHF_2$ is from about 0.01 to 0.56 (e.g., from about 0.05 to about 0.44). The compositions comprising E-$CF_3CH$=CHF and $CHF_2CHF_2$ are considered to provide capacity and COP within 3% of the maximum attainable performance when the weight ratio of E-$CF_3CH$=CHF to the total amount of E-$CF_3CH$=CHF and $CHF_2CHF_2$ is from about 0.01 to 0.48 (e.g., from about 0.05 to about 0.40). The compositions comprising E-$CF_3CH$=CHF and $CHF_2CHF_2$ are considered to provide capacity and COP within 2% of the maximum attainable performance when the weight ratio of E-$CF_3CH$=CHF to the total amount of E-$CF_3CH$=CHF and $CHF_2CHF_2$ is from about 0.01 to 0.39 (e.g., from about 0.05 to about 0.39). The compositions comprising E-$CF_3CH$=CHF and $CHF_2CHF_2$ are considered to provide capacity and COP within 1% of the maximum attainable performance when the weight ratio of E-$CF_3CH$=CHF to the total amount of E-$CF_3CH$=CHF and $CHF_2CHF_2$ is from about 0.01 to 0.20 (e.g., from about 0.05 to about 0.39).

In one embodiment, component (b) is $CHF_2CHF_2$ and the weight ratio of E-$CF_3CH$=CHF to the total amount of E-$CF_3CH$=CHF and $CHF_2CHF_2$ is from about 0.09 to 0.99. The compositions comprising E-$CF_3CH$=CHF and $CHF_2CHF_2$ are considered to have GWP less than 1000 when the weight ratio of E-$CF_3CH$=CHF to the total amount of E-$CF_3CH$=CHF and $CHF_2CHF_2$ is from about 0.09 to 0.99 (e.g., from about 0.10 to about 0.82). The compositions comprising E-$CF_3CH$=CHF and $CHF_2CHF_2$ are considered to have GWP less than 300 when the weight ratio of E-$CF_3CH$=CHF to the total amount of E-$CF_3CH$=CHF and $CHF_2CHF_2$ is from about 0.73 to 0.99 (e.g., from about 0.73 to about 0.82. The compositions comprising E-$CF_3CH$=CHF and $CHF_2CHF_2$ are considered to have GWP less than 150 when the weight ratio of E-$CF_3CH$=CHF to the total amount of E-$CF_3CH$=CHF and $CHF_2CHF_2$ is from about 0.87 to 0.99 (e.g., from about 0.73 to about 0.82). Of note are compositions comprising from about 10 weight percent to about 40 weight percent E-$CF_3CH$=CHF and from about 90 weight percent to about 60 weight percent $CHF_2CHF_2$. Also of note are compositions comprising from about 20 weight percent to about 40 weight percent E-$CF_3CH$=CHF and from about 80 weight percent to about 60 weight percent $CHF_2CHF_2$. These compositions are considered non-flammable, to provide low glide and to provide the maximum volumetric heating capacity and energy efficiency for this working fluid.

In one embodiment, component (b) is $CF_3CH_2F$ and the weight ratio of E-$CF_3CH$=CHF to the total amount of E-$CF_3CH$=CHF and $CF_3CH_2F$ is from about 0.01 to 0.82 (e.g., from about 0.05 to about 0.82). Of note are compositions comprising E-$CF_3CH$=CHF and $CF_3CH_2F$ that are considered to be non-flammable when the weight ratio of E-$CF_3CH$=CHF to the total amount of E-$CF_3CH$=CHF and $CF_3CH_2F$ is from about 0.01 to 0.82 (e.g., from about 0.05 to about 0.82). Also of note are compositions comprising E-$CF_3CH$=CHF and $CF_3CH_2F_2$ that are considered to be non-flammable when the weight ratio of E-$CF_3CH$=CHF to the total amount of E-$CF_3CH$=CHF and $CF_3CH_2F$ is from about 0.01 to 0.81 (e.g., from about 0.05 to about 0.81). Also of note are compositions comprising E-$CF_3CH$=CHF and $CF_3CH_2F_2$ that are considered to be non-flammable when the weight ratio of E-$CF_3CH$=CHF to the total amount of E-$CF_3CH$=CHF and $CF_3CH_2F$ is from about 0.01 to 0.80 (e.g., from about 0.05 to about 0.80).

In one embodiment, the compositions disclosed herein may be used in combination with a desiccant in a refrigeration or air-conditioning equipment (including chillers), to aid in removal of moisture. Desiccants may be composed of activated alumina, silica gel, or zeolite-based molecular sieves. Representative molecular sieves include MOLSIV XH-7, XH-6, XH-9 and XH-11 (UOP LLC, Des Plaines, Ill.). Of note are molecular sieves having nominal pore size from about 3 Angstroms to about 6 Angstroms.

In one embodiment, the compositions disclosed herein may be used in combination with at least one lubricant selected from the group consisting of polyalkylene glycols, polyol esters, polyvinylethers, mineral oils, alkylbenzenes, synthetic paraffins, synthetic naphthenes, and poly(alpha) olefins.

In some embodiments, lubricants useful in combination with the compositions as disclosed herein may comprise those suitable for use with refrigeration or air-conditioning apparatus. Among these lubricants are those conventionally used in vapor compression refrigeration apparatus utilizing chlorofluorocarbon refrigerants. In one embodiment, lubricants comprise those commonly known as "mineral oils" in the field of compression refrigeration lubrication. Mineral oils comprise paraffins (i.e., straight-chain and branched-carbon-chain, saturated hydrocarbons), naphthenes (i.e. cyclic paraffins) and aromatics (i.e. unsaturated, cyclic hydrocarbons containing one or more rings characterized by alternating double bonds). In one embodiment, lubricants comprise those commonly known as "synthetic oils" in the field of compression refrigeration lubrication. Synthetic oils comprise alkylaryls (i.e. linear and branched alkyl alkylbenzenes), synthetic paraffins and naphthenes, and poly(alphaolefins). Representative conventional lubricants are the commercially available BVM 100 N (paraffinic mineral oil sold by BVA Oils), naphthenic mineral oil commercially available from Crompton Co. under the trademarks Suniso® 3GS and Suniso® 5GS, naphthenic mineral oil commercially available from Pennzoil under the trademark Sontex® 372LT, naphthenic mineral oil commercially available from Calumet Lubricants under the trademark Calumet® RO-30, linear alkylbenzenes commercially available from Shrieve Chemicals under the trademarks Zerol® 75, Zerol® 150 and Zerol® 500, and HAB 22 (branched alkylbenzene sold by Nippon Oil).

In other embodiments, lubricants may also comprise those which have been designed for use with hydrofluorocarbon refrigerants and are miscible with refrigerants of the present invention under compression refrigeration and air-conditioning apparatus' operating conditions. Such lubricants include, but are not limited to, polyol esters (POEs) such as Castrol® 100 (Castrol, United Kingdom), polyalkylene glycols (PAGs) such as RL-488A from Dow (Dow Chemical, Midland, Mich.), polyvinyl ethers (PVEs), and polycarbonates (PCs).

Lubricants are selected by considering a given compressor's requirements and the environment to which the lubricant will be exposed.

Of particular note are lubricants selected from the group consisting of POEs, PAGs, PVEs and PCs for use with the working fluids comprising (a) E-CF$_3$CH=CHF and (b) at least one compound of the formula CF$_2$XCHFY wherein X and Y are each selected from the group consisting of H and F; provided that when X is H, Y is F and when X is F, Y is H. Of particular note are lubricants selected from POEs or PAGs for use with the working fluids as disclosed herein.

In one embodiment, the compositions as disclosed herein may further comprise (in addition to the working fluids) an additive selected from the group consisting of compatibilizers, UV dyes, solubilizing agents, tracers, stabilizers, perfluoropolyethers (PFPE), and functionalized perfluoropolyethers, and mixtures thereof. Of note are compositions comprising from about 1 weight percent to about 10 weight percent of hydrocarbon compatibilizers for mineral oil lubricant (for example, propane, cyclopropane, n-butane, isobutane, n-pentane, isopentane, and/or neopentane). Included are formulations comprising (i) a composition comprising from about 10 weight percent to about 40 weight percent E-CF$_3$CH=CHF and from about 90 weight percent to about 60 weight percent CHF$_2$CHF$_2$ (e.g., from about 20 weight percent to about 40 weight percent E-CF$_3$CH=CHF and from about 80 weight percent to about 60 weight percent CHF$_2$CHF$_2$) based on the weight of component (i) and (ii) from about 1 weight percent to about 10 weight percent based on the total weight of the formulation of hydrocarbon compatibilizer. Of particular note are hydrocarbon compatibilizers including cyclopropane, cyclobutane, n-butane, isobutane, isobutene and n-pentane. Also of note are compositions comprising from about 1 weight percent to about 5 weight percent of said hydrocarbon compatibilizers.

In one embodiment, the compositions may be used with about 0.01 weight percent to about 5 weight percent of a stabilizer, free radical scavenger or antioxidant. Such other additives include but are not limited to, nitromethane, hindered phenols, hydroxylamines, thiols, phosphites, or lactones. Single additives or combinations may be used.

Optionally, in another embodiment, certain refrigeration, air-conditioning, or heat pump system additives may be added, as desired, to the working fluids as disclosed herein in order to enhance performance and system stability. These additives are known in the field of refrigeration and air-conditioning, and include, but are not limited to, anti wear agents, extreme pressure lubricants, corrosion and oxidation inhibitors, metal surface deactivators, free radical scavengers, and foam control agents. In general, these additives may be present in the working fluids in small amounts relative to the overall composition. Typically concentrations of from less than about 0.1 weight percent to as much as about 3 weight percent of each additive are used. These additives are selected on the basis of the individual system requirements. These additives include members of the triaryl phosphate family of EP (extreme pressure) lubricity additives, such as butylated triphenyl phosphates (BTPP), or other alkylated triaryl phosphate esters, e.g. Syn-O-Ad 8478 from Akzo Chemicals, tricresyl phosphates and related compounds. Additionally, the metal dialkyl dithiophosphates (e.g., zinc dialkyl dithiophosphate (or ZDDP), Lubrizol 1375 and other members of this family of chemicals may be used in compositions of the present invention. Other anti-wear additives include natural product oils and asymmetrical polyhydroxyl lubrication additives, such as Synergol TMS (International Lubricants). Similarly, stabilizers such as antioxidants, free radical scavengers, and water scavengers may be employed. Compounds in this category can include, but are not limited to, butylated hydroxy toluene (BHT), epoxides, and mixtures thereof. Corrosion inhibitors include dodecyl succinic acid (DDSA), amine phosphate (AP), oleoyl sarcosine, imidazone derivatives and substituted sulfphonates. Metal surface deactivators include areoxalyl bis (benzylidene) hydrazide (CAS reg no. 6629-10-3), N,N'-bis (3,5-di-tert-butyl-4-hydroxyhydrocinnamoylhydrazine (CAS reg no. 32687-78-8), 2,2,'-oxamidobis-ethyl-(3,5-di-tert-butyl-4-hydroxyhydrocinnamate (CAS reg no. 70331-94-1), N,N'-(disalicyclidene)-1,2-diaminopropane (CAS reg no. 94-91-7) and ethylenediaminetetra-acetic acid (CAS reg no. 60-00-4) and its salts, and mixtures thereof.

In other embodiments, additional additives include stabilizers comprising at least one compound selected from the group consisting of hindered phenols, thiophosphates, butylated triphenylphosphorothionates, organo phosphates, or phosphites, aryl alkyl ethers, terpenes, terpenoids, epoxides, fluorinated epoxides, oxetanes, ascorbic acid, thiols, lactones, thioethers, amines, nitromethane, alkylsilanes, benzophenone derivatives, aryl sulfides, divinyl terephthalic acid, diphenyl terephthalic acid, ionic liquids, and mixtures thereof. Representative stabilizer compounds include but are not limited to tocopherol; hydroquinone; t-butyl hydroquinone; monothiophosphates; and dithiophosphates, commercially available from Ciba Specialty Chemicals, Basel, Switzerland, hereinafter "Ciba," under the trademark Irgalube® 63; dialkylthiophosphate esters, commercially available from Ciba under the trademarks Irgalube® 353 and Irgalube® 350, respectively; butylated triphenylphosphorothionates, commercially available from Ciba under the trademark Irgalube® 232; amine phosphates, commercially available from Ciba under the trademark Irgalube® 349 (Ciba); hindered phosphites, commercially available from Ciba as Irgafos® 168; a phosphate such as (Tris-(di-tert-butylphenyl), commercially available from Ciba under the trademark Irgafos® OPH; (Di-n-octyl phosphite); and isodecyl diphenyl phosphite, commercially available from Ciba under the trademark Irgafos® DDPP; anisole; 1,4-dimethoxybenzene; 1,4-diethoxybenzene; 1,3,5-trimethoxybenzene; d-limonene; retinal; pinene; menthol; Vitamin A; terpinene; dipentene; lycopene; beta carotene; bornane; 1,2-propylene oxide; 1,2-butylene oxide; n-butyl glycidyl ether; trifluoromethyloxirane; 1,1-bis(trifluoromethyl)oxirane; 3-ethyl-3-hydroxymethyl-oxetane, such as OXT-101 (Toagosei Co., Ltd); 3-ethyl-3-((phenoxy)methyl)-oxetane, such as OXT-211 (Toagosei Co., Ltd); 3-ethyl-3-((2-ethylhexyloxy)methyl)-oxetane, such as OXT-212 (Toagosei Co., Ltd); ascorbic acid; methanethiol (methyl mercaptan); ethanethiol (ethyl mercaptan); Coenzyme A; dimercaptosuccinic acid (DMSA); grapefruit mercaptan ((R)-2-(4-methylcyclohex-3-enyl)propane-2-thiol)); cysteine ((R)-2-amino-3-sulfanyl-propanoic acid); lipoamide (1,2-dithiolane-3- pentanamide); 5,7-bis(1,1-dimethylethyl)-3-[2,3(or 3,4)-dimethylphenyl]-2(3H)-benzofuranone, commercially available from Ciba under the trademark Irganox® HP-136; benzyl phenyl sulfide; diphenyl sulfide; diisopropylamine; dioctadecyl 3,3'-thiodipropionate, commercially available from Ciba under the trademark Irganox® PS 802 (Ciba); didodecyl 3,3'-thiopropionate, commercially available from Ciba under the trademark Irganox® PS 800; di-(2,2,6,6-tetramethyl-4-piperidyl)sebacate, commercially available from Ciba under the trademark Tinuvin® 770; poly-(N-hydroxyethyl-2,2,6,6-tetramethyl-4-hydroxy-piperidyl succinate, commercially available from Ciba under the trademark Tinuvin® 622LD (Ciba); methyl bis tallow amine; bis tallow amine; phenol-alpha-naphthylamine; bis(dimethylamino)methylsilane (DMAMS); tris(trimethylsilyl)silane (TTMSS); vinyltriethoxysilane; vinyltrimethoxysilane; 2,5-difluorobenzophenone; 2',5'-dihydroxyacetophenone; 2-aminobenzophenone; 2-chlorobenzophenone; benzyl phenyl sulfide; diphenyl sulfide; dibenzyl sulfide; ionic liquids; and others.

In one embodiment, ionic liquid stabilizers comprise at least one ionic liquid. Ionic liquids are organic salts that are liquid or have melting points below 100° C. In another embodiment, ionic liquid stabilizers comprise salts containing cations selected from the group consisting of pyridinium, pyridazinium, pyrimidinium, pyrazinium, imidazolium, pyrazolium, thiazolium, oxazolium and triazolium; and anions selected from the group consisting of [$BF_4$]-, [$PF_6$]-, [$SbF_6$]-, [$CF_3SO_3$]-, [$HCF_2CF_2SO_3$]-, [$CF_3HFCCF_2SO_3$]-, [$HCClFCF_2SO_3$]-, [($CF_3SO_2$)$_2$N]-, [($CF_3CF_2SO_2$)$_2$N]-, [($CF_3SO_2$)$_3$C]-, [$CF_3CO_2$]-, and F—. Representative ionic liquid stabilizers include emim $BF_4$ (1-ethyl-3-methylimidazolium tetrafluoroborate); bmim $BF_4$ (1-butyl-3-methylimidazolium tetraborate); emim $PF_6$ (1-ethyl-3-methylimidazolium hexafluorophosphate); and bmim $PF_6$ (1-butyl-3-methylimidazolium hexafluorophosphate), all of which are available from Fluka (Sigma-Aldrich).

In one embodiment, the compositions as disclosed herein may be used with a perfluoropolyether additive. A common characteristic of perfluoropolyethers is the presence of perfluoroalkyl ether moieties. Perfluoropolyether is synonymous to perfluoropolyalkylether. Other synonymous terms frequently used include "PFPE", "PFAE", "PFPE oil", "PFPE fluid", and "PFPAE". For example, a perfluoropolyether, having the formula of $CF_3$—($CF_2$)$_2$—O—[CF($CF_3$)—$CF_2$—O]$_{j'}$—R'f, is commercially available from DuPont under the trademark Krytox® In the formula, j' is 2-100, inclusive and R' f is $CF_2CF_3$, a $C_3$ to $C_6$ perfluoroalkyl group, or combinations thereof.

Other PFPEs, commercially available from Ausimont of Milan, Italy, under the trademarks Fomblin® and Galden®, and produced by perfluoroolefin photooxidation, can also be used. PFPE commercially available under the trademark Fomblin®-Y can have the formula of $CF_3O(CF_2CF(CF_3)$—O—)$_m$($CF_2$—O—)$_n$—$R_1$f. Also suitable is $CF_3O[CF_2CF(CF_3)O]_m$($CF_2CF_2O$)o'($CF_2O$)$_n$—$R_1$f. In the formulae $R_1$f is $CF_3$, $C_2F_5$, $C_3F_7$, or combinations of two or more thereof; (m'+n') is 8-45, inclusive; and m/n is 20-1000, inclusive; o' is 1; (m'+n'+o') is 8-45, inclusive; m'/n' is 20-1000, inclusive.

PFPE commercially available under the trademark Fomblin®-Z can have the formula of $CF_3O(CF_2CF_2$—O—)$_{p'}$($CF_2$—O—)$_{q'}CF_3$ where (p'+q') is 40-180 and p'/q' is 0.5-2, inclusive.

Another family of PFPE, commercially available under the trademark Demnum™ from Daikin Industries, Japan, can also be used. It can be produced by sequential oligomerization and fluorination of 2,2,3,3-tetrafluorooxetane, yielding the formula of F—[($CF_2$)$_3$—O]$_{t'}$—$R_2$f where $R_2$f is $CF_3$, $C_2F_5$, or combinations thereof and t' is 2-200, inclusive.

Heat Pumps

In one embodiment of the present invention is provided a heat pump apparatus containing a working fluid comprising (a) E-$CF_3$CH=CHF and (b) at least one compound of the formula $C_2H_2F_4$; and the weight ratio of E-$CF_3$CH=CHF to the total amount of E-$CF_3$CH=CHF and $C_2H_2F_4$ is from about 0.01 to 0.99 (e.g., from about 0.05 to about 0.82).

In one embodiment of the heat pump apparatus, component (b) is $CHF_2CHF_2$ and the weight ratio of E-$CF_3$CH=CHF to the total amount of E-$CF_3$CH=CHF and $CHF_2CHF_2$ is from about 0.01 to 0.69 (e.g., from about 0.05 to about 0.69). In another embodiment of the heat pump apparatus, component (b) is $CHF_2CHF_2$ and the weight ratio of E-$CF_3$CH=CHF to the total amount of E-$CF_3$CH=CHF and $CHF_2CHF_2$ is from about 0.01 to 0.56 (e.g., from about 0.05 to about 0.56). In another embodiment, component (b) is $CHF_2CHF_2$ and weight ratio of E-$CF_3$CH=CHF to the total amount of E-$CF_3$CH=CHF and $CHF_2CHF_2$ is from about 0.01 to 0.53 (e.g., from about 0.05 to about 0.53). In another embodiment, component (b) is $CHF_2CHF_2$ and the weight ratio of E-$CF_3$CH=CHF to the total amount of E-$CF_3$CH=CHF and $CHF_2CHF_2$ is from about 0.01 to 0.48 (e.g., from about 0.05 to about 0.48). In another embodiment, component (b) is $CHF_2CHF_2$ and the weight ratio of E-$CF_3$CH=CHF to the total amount of E-$CF_3$CH=CHF and $CHF_2CHF_2$ is from about 0.01 to 0.39 (e.g., from about 0.05 to about 0.39). In another embodiment, component (b) is $CHF_2CHF_2$ and the weight ratio of E-$CF_3$CH=CHF to the total amount of E-$CF_3$CH=CHF and $CHF_2CHF_2$ is from about 0.01 to 0.20 (e.g., from about 0.05 to about 0.20).

In another embodiment, component (b) is $CHF_2CHF_2$ and the weight ratio of E-$CF_3$CH=CHF to the total amount of E-$CF_3$CH=CHF and $CHF_2CHF_2$ is from about 0.09 to 0.99 (e.g., from about 0.09 to about 0.82 or from about 0.10 to about 0.82).

A heat pump is a type of apparatus for producing heating and/or cooling. A heat pump includes an evaporator, a compressor, a condenser, and an expansion device. A working fluid circulates through these components in a repeating cycle. Heating is produced at the condenser where energy (in the form of heat) is extracted from the vapor working fluid as it is condensed to form liquid working fluid. Cooling is produced at the evaporator where energy is absorbed to evaporate the working fluid to form vapor working fluid.

Figure 2:
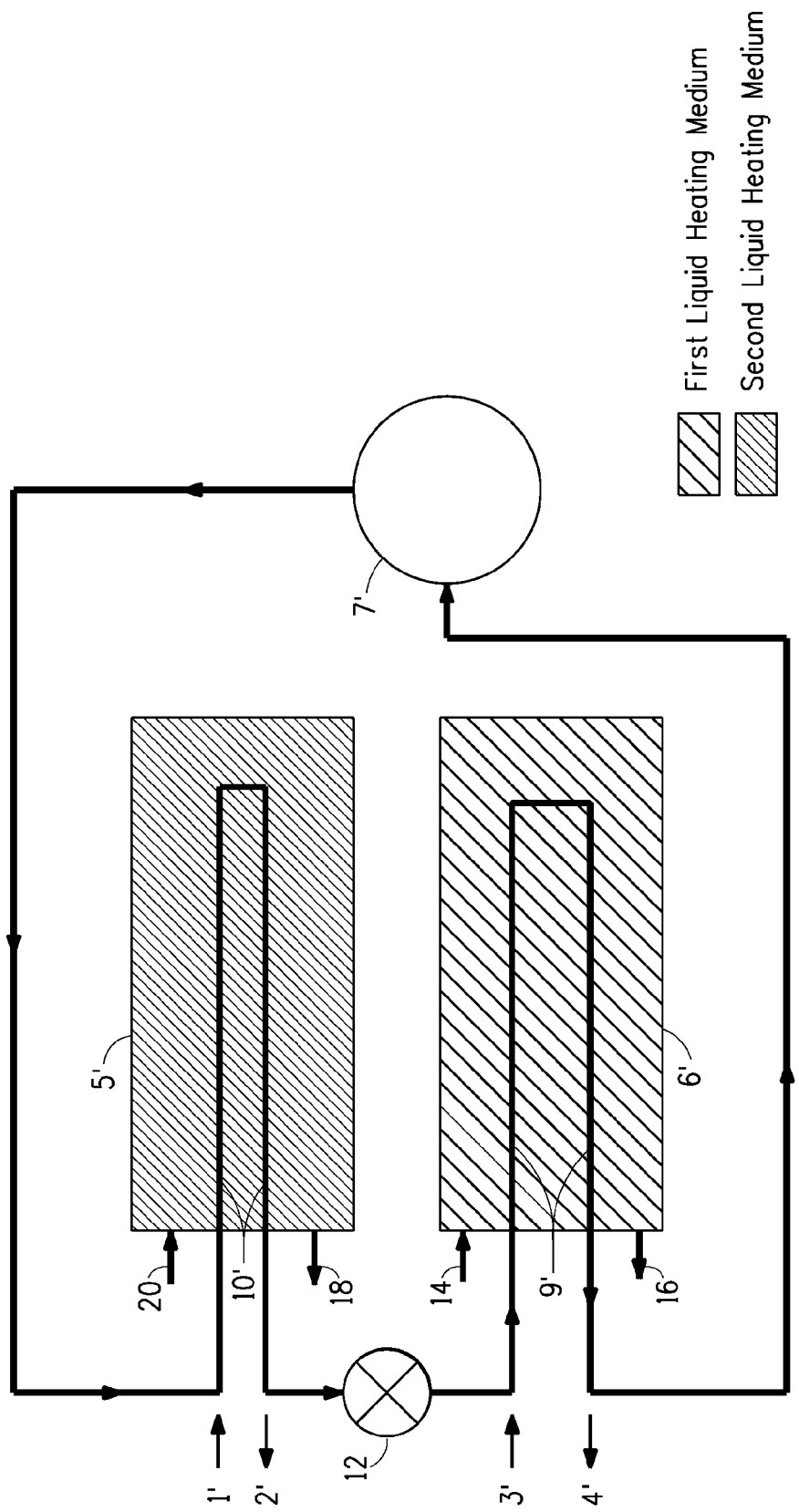
FIG. 2 is a schematic diagram of one embodiment of a direct expansion heat pump apparatus which utilizes a composition containing E-$CF_3CH$=CHF and (b) at least one tetrafluoroethane of the formula $C_2H_2F_4$.

Heat pumps may include flooded evaporators one embodiment of which is shown in FIG. 1, or direct expansion evaporators one embodiment of which is shown in FIG. 2.

Heat pumps may utilize positive displacement compressors or dynamic compressors (e.g. centrifugal compressors). Positive displacement compressors include reciprocating, screw, or scroll compressors. Of note are heat pumps that use screw compressors. Also of note are heat pumps that use centrifugal compressors.

Residential heat pumps are used to produce heat air to warm a residence or home (including single family or multi-unit attached homes) and produce maximum condenser operating temperatures from about 30° C. to about 50° C.

Of note are high temperature heat pumps that may be used to heat air, water, another heat transfer medium or some portion of an industrial process, such as a piece of equipment, storage area or process stream. These heat pumps can produce maximum condenser operating temperatures greater than about 55° C. The maximum condenser operating temperature that can be achieved in a high temperature heat pump will depend upon the working fluid used. This maximum condenser operating temperature is limited by the normal boiling characteristics of the working fluid and also by the pressure to which the heat pump's compressor can raise the vapor working fluid pressure. This maximum pressure is also related to the working fluid used in the heat pump.

Also of note are heat pumps that are used to produce heating and cooling simultaneously. For instance, a single heat pump unit may produce hot water for domestic use and may also produce cooling for comfort air conditioning in the summer.

Heat pumps, including both flooded evaporator and direct expansion, may be coupled with an air handling and distribution system to provide comfort air conditioning (cooling and dehumidifying the air) and/or heating to residence (single family or attached homes) and large commercial buildings, including hotels, office buildings, hospitals, universities and the like. In another embodiment, heat pumps may be used to heat water.

To illustrate how heat pumps operate, reference is made to the Figures. A flooded evaporator heat pump is shown in FIG. 1. In this heat pump a first heat transfer medium, which is a warm liquid, which comprises water, and, in some embodiments, additives, or other heat transfer medium such as a glycol (e.g., ethylene glycol or propylene glycol), enters the heat pump carrying heat from a low temperature source, such as a building air handling system or warmed-up water from condensers of a chiller plant flowing to the cooling tower, shown entering at arrow 3, through a tube bundle or coil 9, in an evaporator 6, which has an inlet and an outlet. The warm first heat transfer medium is delivered to the evaporator, where it is cooled by liquid working fluid, which is shown in the lower portion of the evaporator. The liquid working fluid evaporates at a lower temperature than the warm first heat transfer medium which flows through tube bundle or coil 9. The cooled first heat transfer medium re-circulates back to the low temperature heat source as shown by arrow 4, via a return portion of tube bundle or coil 9. The liquid working fluid, shown in the lower portion of evaporator 6 in FIG. 1, vaporizes and is drawn into a compressor 7, which increases the pressure and temperature of the working fluid vapor. The compressor compresses this vapor so that it may be condensed in a condenser 5 at a higher pressure and temperature than the pressure and temperature of the working fluid vapor when it exits the evaporator. A second heat transfer medium enters the condenser via a tube bundle or coil 10 in condenser 5 from a location where high temperature heat is provided ("heat sink") such as a domestic or service water heater or a hydronic heating system at arrow 1 in FIG. 1. The second heat transfer medium is warmed in the process and returned via a return loop of tube bundle or coil 10 and arrow 2 to the heat sink. This second heat transfer medium cools the working fluid vapor in the condenser and causes the vapor to condense to liquid working fluid, so that there is liquid working fluid in the lower portion of the condenser as shown in FIG. 1. The condensed liquid working fluid in the condenser flows back to the evaporator through an expansion device 8, which may be an orifice, capillary tube or expansion valve. Expansion device 8 reduces the pressure of the liquid working fluid, and converts the liquid working fluid partially to vapor, that is to say that the liquid working fluid flashes as pressure drops between the condenser and the evaporator. Flashing cools the working fluid, i.e., both the liquid working fluid and the working fluid vapor to the saturated temperature at evaporator pressure, so that both liquid working fluid and working fluid vapor are present in the evaporator.

In some embodiments the working fluid vapor is compressed to a supercritical state and vessel 5 in FIG. 1 represents a supercitical fluid cooler where the working fluid vapor is cooled to a liquid state without condensation.

In some embodiments the first heat transfer medium used in the apparatus depicted in FIG. 1 is chilled water returning from a building where air conditioning is provided or from some other body to be cooled. Heat is extracted from the returning chilled water at the evaporator 6 and the cooled chilled water is supplied back to the building or other body to be cooled. In this embodiment the apparatus depicted in FIG. 1 functions to simultaneously cool the first heat transfer medium that provides cooling to a body to be cooled (e.g. building air) and heat the second heat transfer medium that provides heating to a body to be heated (e.g. domestic or service water or process stream).

It is understood that the apparatus depicted in FIG. 1 can extract heat at the evaporator 6 from a wide variety of heat sources including solar, geothermal and waste heat and supply heat from the condenser 5 to a wide range of heat sinks.

It should be noted that for a single component working fluid composition, the composition of the vapor working fluid in the evaporator and condenser is the same as the composition of the liquid working fluid in the evaporator and condenser. In this case, evaporation will occur at a constant temperature. However, if a working fluid blend (or mixture) is used, as in the present invention, the liquid working fluid and the working fluid vapor in the evaporator (or in the condenser) may have different compositions. This may lead to inefficient systems and difficulties in servicing the equipment, thus a single component working fluid is more desirable. An azeotrope or azeotrope-like composition will function essentially as a single component working fluid in a heat pump, such that the liquid composition and the vapor composition are essentially the same reducing any inefficiencies that might arise from the use of a non-azeotropic or non-azeotrope-like composition.

One embodiment of a direct expansion heat pump is illustrated in FIG. 2. In the heat pump as illustrated in FIG. 2, first liquid heat transfer medium, which is a warm liquid, such as warm water, enters an evaporator 6' at inlet 14. Mostly liquid working fluid (with a small amount of working fluid vapor) enters a coil 9' in the evaporator at arrow 3' and evaporates. As a result, first liquid heat transfer medium is cooled in the evaporator, and a cooled first liquid heat transfer medium exits the evaporator at outlet 16, and is sent to a low temperature heat source (e.g. warm water flowing to a cooling tower). The working fluid vapor exits the evaporator at arrow 4' and is sent to a compressor 7', where it is compressed and exits as high temperature, high pressure working fluid vapor. This working fluid vapor enters a condenser 5' through a condenser coil 10' at 1'. The working fluid vapor is cooled by a second liquid heat transfer medium, such as water, in the condenser and becomes a liquid. The second liquid heat transfer medium enters the condenser through a condenser heat transfer medium inlet 20. The second liquid heat transfer medium extracts heat from the condensing working fluid vapor, which becomes liquid working fluid, and this warms the second liquid heat transfer medium in the condenser. The second liquid heat transfer medium exits from the condenser through the condenser heat transfer medium outlet 18. The condensed working fluid exits the condenser through lower coil 10' as shown in FIG. 2 and flows through an expansion device 12, which may be an orifice, capillary tube or expansion valve. Expansion device 12 reduces the pressure of the liquid working fluid. A small amount of vapor, produced as a result of the expansion, enters the evaporator with liquid working fluid through coil 9' and the cycle repeats.

In some embodiments the working fluid vapor is compressed to a supercritical state and vessel 5' in FIG. 2 represents a supercritical fluid cooler where the working fluid vapor is cooled to a liquid state without condensation.

In some embodiments the first heat transfer medium used in the apparatus depicted in FIG. 2 is chilled water returning from a building where air conditioning is provided or from some other body to be cooled. Heat is extracted from the returning chilled water at the evaporator 6' and the cooled chilled water is supplied back to the building or other body to be cooled. In this embodiment the apparatus depicted in FIG. 2 functions to simultaneously cool the first heat transfer medium that provides cooling to a body to be cooled (e.g. building air) and heat the second heat transfer medium that provides heating to a body to be heated (e.g. domestic or service water or process stream).

It is understood that the apparatus depicted in FIG. 2 can extract heat at the evaporator 6' from a wide variety of heat sources including solar, geothermal and waste heat and supply heat from the condenser 5' to a wide range of heat sinks.

A centrifugal compressor uses rotating elements to accelerate the working fluid radially, and typically includes an impeller and diffuser housed in a casing. Centrifugal compressors usually take working fluid in at an impeller eye, or central inlet of a circulating impeller, and accelerate it radially outward. Some pressure rise occurs in the impeller, but most of the pressure rise occurs in the diffuser section of the casing, where velocity is converted to pressure. Each impeller-diffuser set is a stage of the compressor. Centrifugal compressors are built with from 1 to 12 or more stages, depending on the final pressure desired and the volume of refrigerant to be handled.

The pressure ratio, or compression ratio, of a compressor is the ratio of absolute discharge pressure to the absolute inlet pressure. Pressure delivered by a centrifugal compressor is practically constant over a relatively wide range of capacities. The pressure a centrifugal compressor can develop depends on the tip speed of the impeller. Tip speed is the speed of the impeller measured at its tip and is related to the diameter of the impeller and its revolutions per minute. The tip speed required in a specific application depends on the compressor work that is required to elevate the thermodynamic state of the working fluid from evaporator to condenser conditions. The volumetric flow capacity of the centrifugal compressor is determined by the size of the passages through the impeller. This makes the size of the compressor more dependent on the pressure required than the volumetric flow capacity required.

Positive displacement compressors draw vapor into a chamber, and the chamber volume is reduced to compress the vapor. After being compressed, the vapor is forced from the chamber by further decreasing the volume of the chamber to zero or nearly zero.

Reciprocating compressors use pistons driven by a crankshaft. They can be either stationary or portable, can be single- or multi-staged, and can be driven by electric motors or internal combustion engines. Small reciprocating compressors from 5 to 30 hp are seen in automotive applications and are typically for intermittent duty. Larger reciprocating compressors up to 100 hp are found in large industrial applications. Discharge pressures can range from low pressure to very high pressure (greater than 5000 psi or 35 MPa).

Screw compressors use two meshed rotating positive-displacement helical screws to force the gas into a smaller space. Screw compressors are usually for continuous operation in commercial and industrial application and may be either stationary or portable. Their application can be from 5 hp (3.7 kW) to over 500 hp (375 kW) and from low pressure to very high pressure (greater than 1200 psi or 8.3 MPa).

Scroll compressors are similar to screw compressors and include two interleaved spiral-shaped scrolls to compress the gas. The output is more pulsed than that of a rotary screw compressor.

Methods

In one embodiment is provided a method for producing heating comprising condensing a vapor working fluid comprising (a) E-$CF_3CH=CHF$ and (b) at least one compound of the formula $C_2H_2F_4$; and the weight ratio of E-$CF_3CH=CHF$ to the total amount of E-$CF_3CH=CHF$ and $C_2H_2F_4$ is from about 0.01 to 0.99 (e.g., from about 0.05 to about 0.82) in a condenser, thereby producing a liquid working fluid.

In one embodiment, the heating is produced in a high temperature heat pump comprising the condenser, and the method further comprises passing a heat transfer medium through the condenser (whereby said condensation of working fluid heats the heat transfer medium) and passing the heated heat transfer medium from the condenser to a body to be heated.

A body to be heated may be any space, object or fluid that may be heated. In one embodiment, a body to be heated may be a room, building, or the passenger compartment of an automobile. Alternatively, in another embodiment, a body to be heated may be another medium or heat transfer fluid.

In one embodiment, the heat transfer medium is water and the body to be heated is water. In another embodiment, the heat transfer medium is water and the body to be heated is air for space heating. In another embodiment, the heat transfer medium is an industrial heat transfer liquid and the body to be heated is a chemical process stream.

In another embodiment, the method to produce heating further comprises compressing the working fluid vapor in a centrifugal compressor.

In one embodiment, the heating is produced in a heat pump comprising the condenser, and the method further comprises passing a fluid to be heated through the condenser, thus heating the fluid. In one embodiment, the fluid is air, and the heated air from the condenser is passed to a space to be heated. In another embodiment, the fluid is a portion of a process stream, and the heated portion is returned to the process.

In one embodiment of the method to produce heating, component (b) is $CHF_2CHF_2$ and the weight ratio of E-$CF_3CH=CHF$ to the total amount of E-$CF_3CH=CHF$ and $CHF_2CHF_2$ is less than 0.70 (e.g., at least about 0.05 but less than 0.70). In another embodiment of the method to produce heating, component (b) is $CHF_2CHF_2$ and the weight ratio of E-$CF_3CH=CHF$ to the total amount of E-$CF_3CH=CHF$ and $CHF_2CHF_2$ is from about 0.01 to 0.69 (e.g., from about 0.05 to about 0.69). In another embodiment of the method to produce heating, component (b) is $CHF_2CHF_2$ and the weight ratio of E-$CF_3CH=CHF$ to the total amount of E-$CF_3CH=CHF$ and $CHF_2CHF_2$ is from about 0.01 to 0.56 (e.g., from about 0.05 to about 0.56). In another embodiment, component (b) is $CHF_2CHF_2$ and the weight ratio of E-CF$_3$CH=CHF to the total amount of E-CF$_3$CH=CHF and CHF$_2$CHF$_2$ is from about 0.01 to 0.53 (e.g., from about 0.05 to about 0.53). In another embodiment, component (b) is CHF$_2$CHF$_2$ and the weight ratio of E-CF$_3$CH=CHF to the total amount of E-CF$_3$CH=CHF and CHF$_2$CHF$_2$ is from about 0.01 to 0.48 (e.g., from about 0.05 to about 0.48). In another embodiment, component (b) is CHF$_2$CHF$_2$ and the weight ratio of E-CF$_3$CH=CHF to the total amount of E-CF$_3$CH=CHF and CHF$_2$CHF$_2$ is from about 0.01 to 0.39 (e.g., from about 0.05 to about 0.39). In another embodiment, component (b) is CHF$_2$CHF$_2$ and the weight ratio of E-CF$_3$CH=CHF to the total amount of E-CF$_3$CH=CHF and CHF$_2$CHF$_2$ is from about 0.01 to 0.20 (e.g., from about 0.05 to about 0.20).

In another embodiment, component (b) is CHF$_2$CHF$_2$ and the weight ratio of E-CF$_3$CH=CHF to the total amount of E-CF$_3$CH=CHF and CHF$_2$CHF$_2$ is from about 0.09 to 0.99 (e.g., from about 0.09 to about 0.82 or from about 0.10 to about 0.82).

In some embodiments, the heat transfer medium may be selected from water, glycol (such as ethylene glycol or propylene glycol). Of particular note is an embodiment wherein the first heat transfer medium is water and the body to be cooled is air for space cooling.

In another embodiment, the heat transfer medium may be an industrial heat transfer liquid, wherein the body to be heated is a chemical process stream, which includes process lines and process equipment such as distillation columns. Of note are industrial heat transfer liquids including ionic liquids, various brines such as aqueous calcium or sodium chloride, glycols such as propylene glycol or ethylene glycol, methanol, and other heat transfer media such as those listed in section 4 of the 2006 ASHRAE Handbook on Refrigeration.

In one embodiment, the method for producing heating comprises extracting heat in a flooded evaporator heat pump as described above with respect to FIG. 1. In this method, the liquid working fluid is evaporated to form a working fluid vapor in the vicinity of a first heat transfer medium. The first heat transfer medium is a warm liquid, such as water, which is transported into the evaporator via a pipe from a low temperature heat source. The warm liquid is cooled and is returned to the low temperature heat source or is passed to a body to be cooled, such as a building. The working fluid vapor is then condensed in the vicinity of a second heat transfer medium, which is a chilled liquid which is brought in from the vicinity of a body to be heated (heat sink). The second heat transfer medium cools the working fluid such that it is condensed to form a liquid working fluid. In this method a flooded evaporator heat pump may also be used to heat domestic or service water or a process stream.

In another embodiment, the method for producing heating comprises producing heating in a direct expansion heat pump as described above with respect to FIG. 2. In this method, the liquid working fluid is passed through an evaporator and evaporates to produce a working fluid vapor. A first liquid heat transfer medium is cooled by the evaporating working fluid. The first liquid heat transfer medium is passed out of the evaporator to a low temperature heat source or a body to be cooled. The working fluid vapor is then condensed in the vicinity of a second heat transfer medium, which is a chilled liquid which is brought in from the vicinity of a body to be heated (heat sink). The second heat transfer medium cools the working fluid such that it is condensed to form a liquid working fluid. In this method, a direct expansion heat pump may also be used to heat domestic or service water or a process stream.

In one embodiment of the method for producing heating, the heat pump includes a compressor which is a centrifugal compressor.

In another embodiment of the invention is provided a method for replacing HFC-134a working fluid in a heat pump designed for HFC-134a comprising providing a replacement working fluid comprising (a) E-CF$_3$CH=CHF and (b) at least one compound of the formula C$_2$H$_2$F$_4$; provided that the weight ratio of E-CF$_3$CH=CHF to the total amount of E-CF$_3$CH=CHF and C$_2$H$_2$F$_4$ is from about 0.01 to 0.99 (e.g., from about 0.05 to about 0.82).

Of note for use in producing heating (including but not limited to as replacements for other heat pump working fluids) are compositions wherein component (b) is CHF$_2$CHF$_2$ and the weight ratio of E-CF$_3$CH=CHF to the total amount of E-CF$_3$CH=CHF and CHF$_2$CHF$_2$ is from about 0.1 to 0.2. Also of note are compositions wherein component (b) is CHF$_2$CHF$_2$ and the weight ratio of E-CF$_3$CH=CHF to the total amount of E-CF$_3$CH=CHF and CHF$_2$CHF$_2$ is from about 0.2 to 0.3. Also of note are compositions wherein component (b) is CHF$_2$CHF$_2$ and the weight ratio of E-CF$_3$CH=CHF to the total amount of E-CF$_3$CH=CHF and CHF$_2$CHF$_2$ is from about 0.3 to 0.4. Also of note are compositions wherein component (b) is CHF$_2$CHF$_2$ and the weight ratio of E-CF$_3$CH=CHF to the total amount of E-CF$_3$CH=CHF and CHF$_2$CHF$_2$ is from about 0.4 to 0.5. Also of note are compositions wherein component (b) is CHF$_2$CHF$_2$ and the weight ratio of E-CF$_3$CH=CHF to the total amount of E-CF$_3$CH=CHF and CHF$_2$CHF$_2$ is from about 0.5 to 0.6. Also of note are compositions wherein component (b) is CHF$_2$CHF$_2$ and the weight ratio of E-CF$_3$CH=CHF to the total amount of E-CF$_3$CH=CHF and CHF$_2$CHF$_2$ is from about 0.6 to 0.7. Also of note are compositions wherein component (b) is CHF$_2$CHF$_2$ and the weight ratio of E-CF$_3$CH=CHF to the total amount of E-CF$_3$CH=CHF and CHF$_2$CHF$_2$ is from about 0.7 to 0.8. Also of note are compositions wherein component (b) is CHF$_2$CHF$_2$ and the weight ratio of E-CF$_3$CH=CHF to the total amount of E-CF$_3$CH=CHF and CHF$_2$CHF$_2$ is from about 0.8 to 0.9.

Also of note for use in producing heating (including but not limited to as replacements for other heat pump working fluids) are compositions wherein component (b) is CF$_3$CH$_2$F and the weight ratio of E-CF$_3$CH=CHF to the total amount of E-CF$_3$CH=CHF and CF$_3$CH$_2$F is from about 0.1 to 0.2. Also of note as replacements are compositions wherein component (b) is CF$_3$CH$_2$F and the weight ratio of E-CF$_3$CH=CHF to the total amount of E-CF$_3$CH=CHF and CF$_3$CH$_2$F is from about 0.2 to 0.3. Also of note as replacements are compositions wherein component (b) is CF$_3$CH$_2$F and the weight ratio of E-CF$_3$CH=CHF to the total amount of E-CF$_3$CH=CHF and CF$_3$CH$_2$F is from about 0.3 to 0.4. Also of note are compositions wherein component (b) is CF$_3$CH$_2$F and the weight ratio of E-CF$_3$CH=CHF to the total amount of E-CF$_3$CH=CHF and CF$_3$CH$_2$F is from about 0.4 to 0.5. Also of note are compositions wherein component (b) is CF$_3$CH$_2$F and the weight ratio of E-CF$_3$CH=CHF to the total amount of E-CF$_3$CH=CHF and CF$_3$CH$_2$F is from about 0.5 to 0.6. Also of note are compositions wherein component (b) is CF$_3$CH$_2$F and the weight ratio of E-CF$_3$CH=CHF to the total amount of E-CF$_3$CH=CHF and CF$_3$CH$_2$F is from about 0.6 to 0.7. Also of note are compositions wherein component (b) is CF$_3$CH$_2$F and the weight ratio of E-CF$_3$CH=CHF to the total amount of E-CF$_3$CH=CHF and CF$_3$CH$_2$F is from about 0.7 to 0.8. Also of note are compositions wherein component (b) is CF$_3$CH$_2$F and the weight ratio of E-CF$_3$CH=CHF to the total amount of E-CF$_3$CH=CHF and CF$_3$CH$_2$F is from about 0.76 to 0.82 (e.g., from about 0.78 to about 82).

Also of note for use in producing heating (including but not limited to as replacements for other heat pump working fluids) are compositions wherein component (b) is a mixture of CHF$_2$CHF$_2$ and CF$_3$CH$_2$F, wherein the weight ratio of CHF$_2$CHF$_2$ to CF$_3$CH$_2$F is at least about 1:4 (e.g., from about 9:1 to about 1:4) and the weight ratio of E-CF$_3$CH=CHF to the total amount of E-CF$_3$CH=CHF, CHF$_2$CHF$_2$ and CF$_3$CH$_2$F is from about 0.1 to 0.2. Also of note are compositions wherein component (b) is a mixture of CHF$_2$CHF$_2$ and CF$_3$CH$_2$F, wherein the weight ratio of CHF$_2$CHF$_2$ to CF$_3$CH$_2$F is at least about 1:4 (e.g., from about 9:1 to about 1:4) and the weight ratio of E-CF$_3$CH=CHF to the total amount of E-CF$_3$CH=CHF, CHF$_2$CHF$_2$ and CF$_3$CH$_2$F is from about 0.2 to 0.3. Also of note are compositions wherein component (b) is a mixture of CHF$_2$CHF$_2$ and CF$_3$CH$_2$F, wherein the weight ratio of CHF$_2$CHF$_2$ to CF$_3$CH$_2$F is at least about 1:4 (e.g., from about 9:1 to about 1:4) and the weight ratio of E-CF$_3$CH=CHF to the total amount of E-CF$_3$CH=CHF, CHF$_2$CHF$_2$ and CF$_3$CH$_2$F is from about 0.3 to 0.4. Also of note are compositions wherein component (b) is a mixture of CHF$_2$CHF$_2$ and CF$_3$CH$_2$F, wherein the weight ratio of CHF$_2$CHF$_2$ to CF$_3$CH$_2$F is at least about 1:4 (e.g., from about 9:1 to about 1:4) and the weight ratio of E-CF$_3$CH=CHF to the total amount of E-CF$_3$CH=CHF, CHF$_2$CHF$_2$ and CF$_3$CH$_2$F is from about 0.4 to 0.5. Also of note are compositions wherein component (b) is a mixture of CHF$_2$CHF$_2$ and CF$_3$CH$_2$F, wherein the weight ratio of CHF$_2$CHF$_2$ to CF$_3$CH$_2$F is at least about 1:4 (e.g., from about 9:1 to about 1:4) and the weight ratio of E-CF$_3$CH=CHF to the total amount of E-CF$_3$CH=CHF, CHF$_2$CHF$_2$ and CF$_3$CH$_2$F is from about 0.5 to 0.6. Also of note are compositions wherein component (b) is a mixture of CHF$_2$CHF$_2$ and CF$_3$CH$_2$F, wherein the weight ratio of CHF$_2$CHF$_2$ to CF$_3$CH$_2$F is at least about 1:4 (e.g., from about 9:1 to about 1:4) and the weight ratio of E-CF$_3$CH=CHF to the total amount of E-CF$_3$CH=CHF, CHF$_2$CHF$_2$ and CF$_3$CH$_2$F is from about 0.6 to 0.7. Also of note are compositions wherein component (b) is a mixture of CHF$_2$CHF$_2$ and CF$_3$CH$_2$F, wherein the weight ratio of CHF$_2$CHF$_2$ to CF$_3$CH$_2$F is at least about 1:4 (e.g., from about 9:1 to about 1:4) and the weight ratio of E-CF$_3$CH=CHF to the total amount of E-CF$_3$CH=CHF, CHF$_2$CHF$_2$ and CF$_3$CH$_2$F is from about 0.7 to 0.8. Of particular note for the compositions comprising both CHF$_2$CHF$_2$ to CF$_3$CH$_2$F described above are compositions where the weight ratio of CHF$_2$CHF$_2$ to CF$_3$CH$_2$F is from about 9:1 to about 1:1.25 (for example 1.25:1 to about 1:1.25).

In one embodiment of the method to replace HFC-134a, component (b) is CHF$_2$CHF$_2$ and the weight ratio of E-CF$_3$CH=CHF to the total amount of E-CF$_3$CH=CHF and CHF$_2$CHF$_2$ is from about 0.01 to 0.69 (e.g., from about 0.05 to about 0.69). In another embodiment of the method to replace HFC-134a, component (b) is CHF$_2$CHF$_2$ and the weight ratio of E-CF$_3$CH=CHF to the total amount of E-CF$_3$CH=CHF and CHF$_2$CHF$_2$ is from about 0.01 to 0.56. In another embodiment, component (b) is CHF$_2$CHF$_2$ and weight ratio of E-CF$_3$CH=CHF to the total amount of E-CF$_3$CH=CHF and CHF$_2$CHF$_2$ is from about 0.01 to 0.53 (e.g., from about 0.05 to about 0.53). In another embodiment, component (b) is CHF$_2$CHF$_2$ and the weight ratio of E-CF$_3$CH=CHF to the total amount of E-CF$_3$CH=CHF and CHF$_2$CHF$_2$ is from about 0.01 to 0.48 (e.g., from about 0.05 to about 0.48). In another embodiment, component (b) is CHF$_2$CHF$_2$ and the weight ratio of E-CF$_3$CH=CHF to the total amount of E-CF$_3$CH=CHF and CHF$_2$CHF$_2$ is from about 0.01 to 0.39 (e.g., from about 0.05 to about 0.39). In another embodiment, component (b) is CHF$_2$CHF$_2$ and the weight ratio of E-CF$_3$CH=CHF to the total amount of E-CF$_3$CH=CHF and CHF$_2$CHF$_2$ is from about 0.01 to 0.20 (e.g., from about 0.05 to about 0.20).

In another embodiment, component (b) is CHF$_2$CHF$_2$ and the weight ratio of E-CF$_3$CH=CHF to the total amount of E-CF$_3$CH=CHF and CHF$_2$CHF$_2$ is from about 0.09 to 0.99 (e.g., from about 0.10 to about 0.85).

In this method of replacing HFC-134a, the compositions disclosed herein are useful in centrifugal heat pumps that may have been originally designed and manufactured to operate with HFC-134a.

In replacing HFC-134a with the compositions as disclosed herein in existing equipment, additional advantages may be realized by making adjustments to equipment or operating conditions or both. For example, impeller diameter and impeller speed may be adjusted in a centrifugal heat pump where a composition is being used as a replacement working fluid.

In one embodiment, the method of replacing HFC-134a further comprises increasing the rotational speed of the impeller of the centrifugal compressor in order to better match the heat pump heating rate (and in some instances both heating and cooling rates) achieved with the HFC-134a working fluid. Increasing rotational speed of the impeller increases the working fluid circulation rate and the resulting heating and cooling rates.

Alternatively, in another embodiment, the method of replacing HFC-134a further comprises replacing the centrifugal compressor impeller with an impeller of larger diameter in order to better match the heating and cooling rates achieved with the HFC-134a working fluid.

Alternatively, in this method of replacing HFC-134a, the compositions as disclosed herein may be useful in new heat pump equipment. In such new equipment, a centrifugal compressor and the evaporators and condensers used therewith, may be used. New equipment may be designed and optimized for use with the working fluids of the present invention.

In another embodiment of the present invention is provided a method for raising the maximum feasible condenser operating temperature in a heat pump apparatus suitable for use with HFC-134a working fluid relative to the maximum feasible condenser operating temperature when HFC-134a is used as the heat pump working fluid, comprising charging the heat pump with a working fluid comprising (a) E-CF$_3$CH=CHF and (b) at least one compound of the formula C$_2$H$_2$F$_4$; provided that the weight ratio of E-CF$_3$CH=CHF to the total amount of E-CF$_3$CH=CHF and C$_2$H$_2$F$_4$ is from about 0.01 to 0.99 (e.g., from about 0.05 to about 0.82 or from about 0.05 to about 0.80).

In some embodiments, when HFC-134a is used as the working fluid in a heat pump, the maximum feasible condenser operating temperature ranges from about 65 to about 75° C. In another embodiment the maximum feasible operating temperature ranges from about 70 to about 75° C. In one embodiment, the maximum feasible condenser operating temperature is about 71° C. when 134a is used as the heat pump working fluid.

In one embodiment of the method to raise the maximum feasible condenser operating temperature, when a composition comprising E-CF$_3$CH=CHF and CHF$_2$CHF$_2$, is used as the heat pump working fluid, the maximum feasible condenser operating temperature is raised at least about 5° C. as compared to the maximum feasible condenser operating temperature when HFC-134a is used as the heat pump working fluid.

In another embodiment of the method to raise the maximum feasible condenser operating temperature, when a composition comprising E-CF$_3$CH=CHF and CHF$_2$CHF$_2$, is used as the heat pump working fluid, the maximum feasible condenser operating temperature is raised at least about 10° C. as compared to the maximum feasible condenser operating temperature when HFC-134a is used as the heat pump working fluid.

In one embodiment, the maximum feasible condenser operating temperature, when the working fluid comprises E-CF$_3$CH=CHF to CHF$_2$CHF$_2$, is raised to at least about 84° C. in currently available compressors. The maximum feasible condenser operating temperature, when the working fluid comprises E-CF$_3$CH=CHF to CHF$_2$CHF$_2$, is raised to at least about 81° C. in currently available compressors.

In one embodiment, the maximum feasible condenser operating temperature, when the working fluid comprises E-CF$_3$CH=CHF to CHF$_2$CHF$_2$, is raised to a temperature ranging from about 75 to about 80° C. in currently available compressors.

In another embodiment, the maximum feasible condenser operating temperature, when the working fluid comprises E-CF$_3$CH=CHF to CHF$_2$CHF$_2$, is raised to a temperature ranging from about 80 to about 85° C. in currently available compressors.

In another embodiment, the maximum feasible condenser operating temperature, when the working fluid comprises E-CF$_3$CH=CHF to CHF$_2$CHF$_2$, is raised to a temperature ranging from about 81 to about 84° C. in currently available compressors.

In one embodiment, the maximum feasible condenser operating temperature, when the working fluid comprises E-CF$_3$CH=CHF to CHF$_2$CHF$_2$, is raised to at least about 84° C. in currently available compressors. In another embodiment, the maximum feasible condenser operating temperature, when the working fluid comprises E-CF$_3$CH=CHF to CHF$_2$CHF$_2$, is raised to at least about 81° C. in currently available compressors.

In one embodiment of the method to raise the maximum condenser operating temperature, component (b) is CHF$_2$CHF$_2$ and the weight ratio of E-CF$_3$CH=CHF to the total amount of E-CF$_3$CH=CHF and CHF$_2$CHF$_2$ wherein component (b) is CHF$_2$CHF$_2$ and the weight ratio of E-CF$_3$CH=CHF to the total amount of E-CF$_3$CH=CHF and CHF$_2$CHF$_2$ is less than 0.70 (e.g., at least about 0.05 but less than 0.70). In another embodiment of the method to raise the maximum condenser operating temperature, component (b) is CHF$_2$CHF$_2$ and the weight ratio of E-CF$_3$CH=CHF to the total amount of E-CF$_3$CH=CHF and CHF$_2$CHF$_2$ is from about 0.01 to 0.69 (e.g., from about 0.05 to about 0.69). In another embodiment of the method to raise the maximum condenser operating temperature, component (b) is CHF$_2$CHF$_2$ and the weight ratio of E-CF$_3$CH=CHF to the total amount of E-CF$_3$CH=CHF and CHF$_2$CHF$_2$ is from about 0.01 to 0.56. In another embodiment, component (b) is CHF$_2$CHF$_2$ and the weight ratio of E-CF$_3$CH=CHF to the total amount of E-CF$_3$CH=CHF and CHF$_2$CHF$_2$ is from about 0.01 to 0.53 (e.g., from about 0.05 to about 0.53). In another embodiment, component (b) is CHF$_2$CHF$_2$ and the weight ratio of E-CF$_3$CH=CHF to the total amount of E-CF$_3$CH=CHF and CHF$_2$CHF$_2$ is from about 0.01 to 0.48. In another embodiment, component (b) is CHF$_2$CHF$_2$ and the weight ratio of E-CF$_3$CH=CHF to the total amount of E-CF$_3$CH=CHF and CHF$_2$CHF$_2$ is from about 0.01 to 0.39. In another embodiment, component (b) is CHF$_2$CHF$_2$ and the weight ratio of E-CF$_3$CH=CHF to the total amount of E-CF$_3$CH=CHF and CHF$_2$CHF$_2$ is from about 0.01 to 0.20. In another embodiment, component (b) is CHF$_2$CHF$_2$ and the weight ratio of E-CF$_3$CH=CHF to the total amount of E-CF$_3$CH=CHF and CHF$_2$CHF$_2$ is from about 0.09 to 0.99 (e.g., from about 0.09 to about 0.82).

EXAMPLES

The concepts disclosed herein will be further described in the following examples, which do not limit the scope of the invention described in the claims.

Example 1

Heating Performance for Compositions Containing E-HFO-1234ze and HFC-134

The performance of compositions containing trans-HFO-1234ze and HFC-134 in a centrifugal water heating heat pump is determined and compared to performance for HFC-134a. The data are shown in Table 1. The data are based on the following conditions:

| | |
|---|---|
| Evaporator temperature | 26.7° C. |
| Condenser temperature | 80.0° C. |
| Compressor efficiency | 70% |

TABLE 1

| Variable | HFC-134a | E-HFO-1234ze/ HFC-134 (40/60 wt %) | E-HFO-1234ze/ HFC-134 vs 134$^a$ (Δ %) |
|---|---|---|---|
| Liquid subcooling, ° C. | 11.11 | 11.11 | |
| Vapor superheat, ° C. | 0.00 | 0.00 | |
| Pressure (condenser), kPa | 2,642.90 | 2,168.57 | −17.95 |
| Pressure (evaporator), kPa | 698.46 | 565.23 | −19.07 |
| Compressor Discharge Temperature, ° C. | 95.60 | 92.10 | −3.66 |
| Condenser Glide, ° C. | | 0.01 | |
| Evaporator Glide, ° C. | | 0.00 | |
| Net Refrig, kJ/kg | 113.38 | 118.82 | 4.80 |
| Compressor Work, kJ/kg | 39.19 | 39.20 | 0.03 |
| COP for Heating | 3.893 | 4.031 | 3.54 |
| Volumetric Heating Capacity, kJ/m$^3$ | 5,048.45 | 4,306.96 | −14.69 |
| GWP* | 1430 | 662 | −53.71 |

The data indicate that the condenser pressure for the new blend is within the range for some currently available compressors. However, the condenser pressure for HFC-134a exceeds the pressure for some currently available compressors. Compressor work is very close to that for HFC-134a, and therefore the tip speed will be similar and the composition will provide a near drop-in replacement for HFC-134a. Temperature glide for the new blend is negligible, allowing more efficient heat transfer at the heat exchangers and making the blend feasible for use in flooded evaporators. Higher COP for the new blend demonstrates improved energy efficiency relative to HFC-134a. Additionally, the GWP for the new blend is less than half that for HFC-134a.

Note that the GWP for the pure components are taken from:

"Climate Change 2007—IPCC (Intergovernmental Panel on Climate Change) Fourth Assessment Report on Climate Change", from the section entitled "Working Group 1 Report: "The Physical Science Basis", Chapter 2, pp. 212-213, Table 2.14.

Papadimitriou et al., *Physical Chemistry Chemical Physics*, 2007, vol. 9, pp. 1-13.

Javadi et al., Atmospheric Chemistry and Physics Discussions 8, 1069-1088, 2008).

Specifically, the 100 year time horizon GWP values are used. The GWP values for compositions containing more than one component are calculated as weighted averages of the individual component GWP values.

Example 2

Heating Performance for Compositions Containing E-HFO-1234ze and HFC-134

The performance of compositions containing E-HFO-1234ze and HFC-134 in a centrifugal water heating heat pump is determined and compared to performance for HFC-134a. The data are shown in Table 2. The data are based on the following conditions:

| | |
|---|---|
| Evaporator temperature | 26.7° C. |
| Condenser temperature | 80.0° C. |
| Compressor efficiency | 70% |

TABLE 2

| Variable | HFC-134a | E-HFO-1234ze/HFC-134 (65/35 wt %) | E-HFO-1234ze/HFC-134 vs 134$^a$ (% Δ) |
|---|---|---|---|
| Liquid subcooling, ° C. | 11.11 | 11.11 | |
| Vapor superheat, ° C. | 0.00 | 0.00 | |
| Pressure (condenser), kPa | 2,643 | 2125 | −19.61 |
| Pressure (evaporator), kPa | 698.46 | 556.0 | −20.40 |
| Compressor Discharge Temperature, ° C. | 95.60 | 91.02 | −4.79 |
| Condenser Glide, ° C. | | .08 | |
| Evaporator Glide, ° C. | | .05 | |
| Net Refrig, kJ/kg | 113.4 | 112.8 | −0.52 |
| Compressor Work, kJ/kg | 39.19 | 37.64 | −3.96 |
| COP for Heating | 3.893 | 3.996 | 2.65 |
| Volumetric Heating Capacity, kJ/m$^3$ | 5,048 | 4163 | −17.54 |
| GWP* | 1430 | 389 | −72.80 |

The data indicate that the condenser pressure for the new blend is within the range for some currently available compressors. However, the condenser pressure for HFC-134a exceeds the pressure for some currently available compressors. Temperature glide for the new blend is low, making the blend feasible for use in flooded evaporators. Higher COP for the new blend demonstrates improved energy efficiency relative to HFC-134a. Additionally, the GWP for the new blend is significantly reduced relative to the GWP of HFC-134a.

Example 3

Simultaneous Heating and Cooling Performance for Compositions Containing 20 Weight Percent Trans-HFO-1234Ze and 80 weight HFC-134

The apparatus described in FIGS. 1 and 2 can be used to simultaneously provide hot water for domestic use and chilled water for air conditioning. The performance of compositions containing trans-HFO-1234ze and HFC-134 in a centrifugal machine that provides heating and cooling simultaneously is determined and compared to performance for HFC-134a. The data are shown in Table 3. The data are based on the following conditions:

| | |
|---|---|
| Evaporator temperature | 4.4° C. |
| Condenser temperature | 80° C. |
| Compressor efficiency | 70% |

TABLE 3

| | HFC-134a | E-HFO-1234ze/HFC-134 (20/80 wt %) | E-HFO-1234ze/HFC-134 (20/80 wt %) vs HFC-134a (% Δ) |
|---|---|---|---|
| HFO-1234ze-E (CF$_3$CH=CHF) | | 20 | |
| HFC-134 (CHF$_2$CHF$_2$) | | 80 | |
| GWP | 1430 | 881.2 | −38.38 |
| Liquid subcooling, ° C. | 10 | 10 | |
| Vapor superheat, ° C. | 0 | 0 | |
| Pressure (condenser) | 2643 | 2176 | −17.68 |
| Pressure (evaporator) | 342.6 | 271.6 | −20.74 |
| Compressor Discharge Temperature, ° C. | 102.6 | 100.4 | |
| Condenser Glide, ° C. | 0 | 0 | |
| Evaporator Glide, ° C. | 0 | 0.02 | |
| Net Refrigeration, kJ/kg | 98.02 | 108.94 | 11.14 |
| Compressor Work, kJ/kg | 61.21 | 63.08 | 3.06 |
| COP for Cooling | 1.602 | 1.727 | 7.80 |
| Volumetric Cool Capacity, kJ/m$^3$ | 1614 | 1427 | −11.60 |
| COP for Heating | 2.60 | 2.73 | 4.80 |
| Volumetric Heating Capacity, kJ/m$^3$ | 2622 | 2253 | −14.07 |
| Total COP | 4.20 | 4.45 | 5.95 |

The data indicate that this mode of operation is possible with the new blend while it is not with HFC-134a, because the condenser pressure would exceed the maximum feasible value The new blend provides low temperature glide, thus allowing use with flooded evaporators. The compressor work for the new blend is comparable to that with HFC-134a thus the tip speed of the centrifugal compressor impeller will be similar making the new blend a suitable replacement for HFC-134a. The COP for both cooling and heating for the new blend shows improvement over that for HFC-134a.

Example 4

Simultaneous Heating and Cooling Performance for Compositions Containing 60 Weight Percent Trans-HFO-1234Ze and 40 Weight Percent HFC-134

The apparatus described in FIGS. 1 and 2 can be used to simultaneously provide hot water for domestic use and chilled water for air conditioning. The performance of compositions containing trans-HFO-1234ze and HFC-134 in a centrifugal machine that provides heating and cooling simultaneously is determined and compared to performance for HFC-134a. The data are shown in Table 4. The data are based on the following conditions:

| | |
|---|---|
| Evaporator temperature | 4.4° C. |
| Condenser temperature | 80° C. |
| Compressor efficiency | 70% |

TABLE 4

| | HFC-134a | E-HFO-1234ze/ HFC-134 (60/40 wt %) | E-HFO-1234ze/ HFC-134 (60/40 wt %) vs HFC-134a (% Δ) |
|---|---|---|---|
| HFO-1234ze-E (CF$_3$CH=CHF) | | 60 | |
| HFC-134 (CHF$_2$CHF$_2$) | | 40 | |
| GWP | 1430 | 443.6 | −75.88 |
| Liquid subcooling, ° C. | 10 | 10 | |
| Vapor superheat, ° C. | 0 | 0 | |
| Pressure (condenser) | 2643 | 2138 | −21.02 |
| Pressure (evaporator) | 342.6 | 271.4 | −22.87 |
| Compressor Discharge Temperature, ° C. | 102.6 | 97.36 | |
| Condenser Glide, ° C. | 0 | 0.07 | |
| Evaporator Glide, ° C. | 0 | 0.02 | |
| Net Refrigeration, kJ/kg | 98.02 | 98.12 | 0.11 |
| Compressor Work, kJ/kg | 61.21 | 58.83 | −4.28 |
| COP for Cooling | 1.602 | 1.668 | 4.53 |
| Volumetric Cool Capacity, kJ/m$^3$ | 1614 | 1348 | −18.10 |
| COP for Heating | 2.602 | 2.668 | 2.79 |
| Volumetric Heating Capacity, kJ/m$^3$ | 2622 | 2157 | −19.50 |
| Total COP | 4.204 | 4.336 | 3.45 |

The data indicate that this mode of operation is possible with the new blend while it is not with HFC-134a. The new blend provides negligible temperature glide, thus allowing use with flooded evaporators. The compressor work is comparable to that of 134a thus the tip speed of the centrifugal compressor impeller will be similar making it a near drop in replacement for HFC-134a. The COP for both cooling and heating for the new blend shows substantial improvement over that for HFC-134a.

Example 5

Flammability Testing of Compositions Containing E-CF$_3$CH=CHF and CHF$_2$CHF$_2$ A composition containing 70 weight percent E-CF$_3$CH=CHF (E-HFO-1234ze) and 30 weight percent CHF$_2$CHF$_2$ (HFC-134) was tested according to the ASTM E681-2001 test procedure at a temperature of 60° C. and was found to be flammable. A composition containing 69.75 weight percent E-CF$_3$CH=CHF (E-HFC-1234ze) and 30.25 weight percent CHF$_2$CHF$_2$ (HFC-134) was tested under the same conditions and was found to be non-flammable.

Example 6

Flammability Testing of Compositions Containing E-CF$_3$CH=CHF and CF$_3$CH$_2$F A composition containing 82.5 weight percent E-CF$_3$CH=CHF (E-HFO-1234ze) and 17.5 weight percent CF$_3$CH$_2$F (HFC-134a) was tested according to the ASTM E681-2001 test procedure at a temperature of 60° C. and was found to be flammable. A composition containing 81.3 weight percent E-CF$_3$CH=CHF) and 18.7 weight percent CF$_3$CH$_2$F was tested under the same conditions and was found to be flammable with a single value for UFL and LFL. A composition containing 80 weight percent E-CF$_3$CH=CHF) and 20 weight percent CF$_3$CH$_2$F was tested under the same conditions and was found to be non-flammable. A composition containing 81.25 weight percent E-CF$_3$CH=CHF) and 18.75 weight percent CF$_3$CH$_2$F was tested under the same conditions and was found to be non-flammable.

Example 7

Heating Performance for Compositions Containing E-HFO-1234ze and HFC-134a

The performance of compositions containing E-HFO-1234ze and HFC-134a in a centrifugal water heating heat pump is determined and compared to performance for neat HFC-134a. The data are shown in Table 5. The data are based on the following conditions:

| | |
|---|---|
| Evaporator temperature | 26.7° C. |
| Condenser temperature | 80.0° C. |
| Compressor efficiency | 70% |

TABLE 5

| Variable | units | HFC-134a | E-HFO-1234ze/ HFC-134a (75/25 wt %) | E-HFO-1234ze/ HFC-134a vs 134$^a$ (% Δ) |
|---|---|---|---|---|
| Liquid subcooling, ° C. | ° C. | 11.11 | 11.11 | |
| Vapor superheat, ° C. | ° C. | 0.00 | 0.00 | |
| Pressure (condenser), kPa | kPa | 2,643 | 2,196.47 | −16.89 |
| Pressure (evaporator), kPa | kPa | 698.46 | 576.90 | −17.40 |
| Compressor Discharge Temperature, ° C. | ° C. | 95.60 | 91.35 | |
| Condenser Glide, ° C. | ° C. | | 0.51 | |
| Evaporator Glide, ° C. | ° C. | | 0.42 | |
| Net Refrigeration, kJ/kg | kJ/kg | 113.4 | 107.51 | −5.19 |
| Compressor Work, kJ/kg | kJ/kg | 39.19 | 36.58 | −6.66 |
| COP for Heating | | 3.893 | 3.939 | 1.18 |
| Volumetric Heating Capacity, kJ/m$^3$ | kJ/m$^3$ | 5,048 | 4217.90 | −16.44 |
| GWP* | | 1430 | 362 | −74.69 |

The data indicate that the condenser pressure for the new blend is within the range for some currently available compressors. However, the condenser pressure for HFC-134a exceeds the pressure for some currently available compressors. Temperature glide for the new blend is non-negligible but relatively low, making the blend feasible for use in flooded evaporators. Higher COP for the new blend demonstrates improved energy efficiency relative to HFC-134a. Additionally, the GWP for the new blend is significantly reduced relative to the GWP of HFC-134a.

What is cliamed is:

1. A method for producing heating comprising condensing a vapor working fluid comprising (a) from about 60 to 70 weight percent E -CF$_3$CH=CHF and (b) from about 40 to 30 weight percent CHF$_2$CHF$_2$, in a condenser, thereby producing a liquid working fluid; wherein the heating is produced in a high temperature heat pump with said condenser operating at temperatures greater than about 55° C.

2. The method of claim 1, further comprising passing a heat transfer medium through the condenser, whereby said condensation of working fluid heats the heat transfer medium, and passing the heated heat transfer medium from the condenser to a body to be heated.

3. The method of claim 2, comprising passing a heat transfer medium through the condenser, and passing the heated heat transfer medium from the condenser to a body to be heated; wherein the heat transfer medium is water and the body to be heated is water or air for space heating.

4. The method of claim 2, comprising passing a heat transfer medium through the condenser, and passing the heated heat transfer medium from the condenser to a body to be heated; wherein the heat transfer medium is an industrial heat transfer liquid and the body to be heated is a chemical process stream.

5. The method of claim 2, further comprising compressing the working fluid vapor in a centrifugal compressor.

6. The method of claim 1, further comprising passing a fluid to be heated through said condenser, thus heating the fluid.

7. The method of claim 6, wherein the fluid is air and the heated air from the condenser is passed to a space to be heated.

8. The method of claim 6 wherein the fluid to be heated is a portion of a process stream and the heated portion is returned to a process.

9. The method of claim 1 comprising condensing the working fluid in the condenser of the high temperature heat pump, wherein the high temperature heat pump further comprises a centrifugal compressor.

10. The method of claim 1 comprising condensing the vapor working fluid in the condenser, wherein said working fluid comprises (a) from about 60 to 65 weight percent E-CF$_3$CH=CHF and (b) from about 40 to 35 weight percent CHF$_2$CHF$_2$.

11. The method of claim 1 wherein the heating is produced in a high temperature heat pump with said condenser operating at temperatures greater than about 71° C.

12. A heat pump apparatus containing a working fluid comprising (a) from about 60 to 70 weight percent E-CF$_3$CH=CHF and (b) from about 40 to 30 weight percent CHF$_2$CHF$_2$; wherein the heat pump is a high temperature heat pump comprising a condenser, wherein said condenser operates at temperatures greater than about 55° C.

13. The heat pump apparatus of claim 12 comprising a centrifugal compressor.

14. The heat pump apparatus of claim 12, wherein the high temperature heat pump comprises a centrifugal compressor.

15. The heat pump apparatus of claim 12 containing a working fluid comprising (a) from about 60 to 65 weight percent E-CF$_3$CH=CHF and (b) from about 40 to 35 weight percent CHF$_2$CHF$_2$.

16. The heat pump apparatus of claim 12 wherein said condenser operates at temperatures greater than about 71° C.

17. A method of raising a maximum feasible condenser operating temperature in a heat pump apparatus suitable for use with HFC-134a working fluid relative to the maximum feasible condenser operating temperature when HFC-134a is used as a heat pump working fluid, comprising charging the heat pump with a working fluid comprising (a) from about 60 to 70 weight percent E-CF$_3$CH=CHF and (b) from about 40 to 30 weight percent CHF$_2$CHF$_2$; wherein the heat pump is a high temperature heat pump; and wherein said condenser operates at temperature greater than about 71° C.

18. A method for replacing HFC-134a refrigerant in a heat pump designed for HFC-134a comprising providing a replacement working fluid comprising (a) from about 60 to 70 weight percent E-CF$_3$CH=CHF and (b) from about 40 to 30 weight percent CHF$_2$CHF$_2$; wherein the heat pump is a high temperature heat pump with maximum condenser operating temperatures greater than about 55° C.

* * * * *